(12) United States Patent
Leider

(10) Patent No.: US 12,417,766 B2
(45) Date of Patent: Sep. 16, 2025

(54) VOICE USER INTERFACE USING NON-LINGUISTIC INPUT

(71) Applicants: MAGIC LEAP, INC., Plantation, FL (US); Colby Nelson Leider, Plantation, FL (US)

(72) Inventor: Colby Nelson Leider, Coral Gables, FL (US)

(73) Assignee: Magic Leap, Inc., Plantation, FL (US)

(*) Notice: Subject to any disclaimer, the term of this patent is extended or adjusted under 35 U.S.C. 154(b) by 230 days.

(21) Appl. No.: 18/029,355

(22) PCT Filed: Sep. 30, 2021

(86) PCT No.: PCT/US2021/053046
§ 371 (c)(1),
(2) Date: Mar. 29, 2023

(87) PCT Pub. No.: WO2022/072752
PCT Pub. Date: Apr. 7, 2022

(65) Prior Publication Data
US 2023/0386461 A1    Nov. 30, 2023

Related U.S. Application Data

(60) Provisional application No. 63/085,462, filed on Sep. 30, 2020.

(51) Int. Cl.
*G10L 15/22* (2006.01)
*G10L 15/00* (2013.01)
(Continued)

(52) U.S. Cl.
CPC ............ *G10L 15/22* (2013.01); *G10L 15/005* (2013.01); *G10L 15/1807* (2013.01); *G10L 25/63* (2013.01); *G10L 2015/227* (2013.01)

(58) Field of Classification Search
CPC .............................. G10L 15/24; G10L 15/25
See application file for complete search history.

(56) References Cited

U.S. PATENT DOCUMENTS 4,158,750 A    6/1979    Sakoe
4,852,988 A    8/1989    Velez
(Continued)

FOREIGN PATENT DOCUMENTS

CA    2316473 A1    1/2001
CA    2362895 A1    12/2002
(Continued)

OTHER PUBLICATIONS

Chinese Office Action dated Dec. 21, 2023, for CN Application No. 201980050714.4, with English translation, eighteen pages.
(Continued)

*Primary Examiner* — Daniel Abebe
(74) *Attorney, Agent, or Firm* — Morrison & Foerster LLP

(57) ABSTRACT

A voice user interface (VUI) and methods for operating the VUI are disclosed. In some embodiments, the VUI configured to receive and process linguistic and non-linguistic inputs. For example, the VUI receives an audio signal, and the VUI determines whether the audio input comprises a linguistic and/or a non-linguistic input. In accordance with a determination that the audio signal comprises a non-linguistic input, the VUI causes a system to perform an action associated with the non-linguistic input.

21 Claims, 10 Drawing Sheets

(51) Int. Cl.
*G10L 15/18* (2013.01)
*G10L 25/63* (2013.01)

(56) References Cited

U.S. PATENT DOCUMENTS

| | | | |
|---|---|---|---|
| 5,627,899 | A | 5/1997 | Craven et al. |
| 6,433,760 | B1 | 8/2002 | Vaissie |
| 6,491,391 | B1 | 12/2002 | Blum et al. |
| 6,496,799 | B1 | 12/2002 | Pickering |
| 6,738,482 | B1 | 5/2004 | Jaber |
| 6,820,056 | B1 * | 11/2004 | Harif ............... G10L 15/26 704/E15.045 |
| 6,847,336 | B1 | 1/2005 | Lemelson |
| 6,943,754 | B2 | 9/2005 | Aughey |
| 6,977,776 | B2 | 12/2005 | Volkenandt et al. |
| 7,346,654 | B1 | 3/2008 | Weiss |
| 7,347,551 | B2 | 3/2008 | Fergason et al. |
| 7,488,294 | B2 | 2/2009 | Torch |
| 7,587,319 | B2 | 9/2009 | Catchpole |
| 7,979,277 | B2 | 7/2011 | Larri et al. |
| 8,154,588 | B2 | 4/2012 | Burns |
| 8,235,529 | B1 | 8/2012 | Raffle |
| 8,611,015 | B2 | 12/2013 | Wheeler |
| 8,638,498 | B2 | 1/2014 | Bohn et al. |
| 8,696,113 | B2 | 4/2014 | Lewis |
| 8,929,589 | B2 | 1/2015 | Publicover et al. |
| 9,010,929 | B2 | 4/2015 | Lewis |
| 9,274,338 | B2 | 3/2016 | Robbins et al. |
| 9,292,973 | B2 | 3/2016 | Bar-zeev et al. |
| 9,294,860 | B1 | 3/2016 | Carlson |
| 9,323,325 | B2 | 4/2016 | Perez et al. |
| 9,715,875 | B2 | 7/2017 | Piernot |
| 9,720,505 | B2 | 8/2017 | Gribetz et al. |
| 10,013,053 | B2 | 7/2018 | Cederlund et al. |
| 10,025,379 | B2 | 7/2018 | Drake et al. |
| 10,062,377 | B2 | 8/2018 | Larri et al. |
| 10,134,425 | B1 | 11/2018 | Johnson, Jr. |
| 10,289,205 | B1 | 5/2019 | Sumter |
| 10,839,789 | B2 | 11/2020 | Larri et al. |
| 10,971,140 | B2 | 4/2021 | Catchpole |
| 11,151,997 | B2 | 10/2021 | Sugiyama et al. |
| 11,328,740 | B2 | 5/2022 | Lee et al. |
| 11,587,563 | B2 | 2/2023 | Sheeder et al. |
| 11,790,935 | B2 | 10/2023 | Lee et al. |
| 11,854,550 | B2 | 12/2023 | Sheeder et al. |
| 11,854,566 | B2 | 12/2023 | Leider |
| 11,917,384 | B2 | 2/2024 | Roach |
| 12,094,489 | B2 | 9/2024 | Lee |
| 12,238,496 | B2 | 2/2025 | Roach et al. |
| 12,243,531 | B2 | 3/2025 | Sheeder et al. |
| 12,327,573 | B2 | 6/2025 | Sheeder et al. |
| 12,347,448 | B2 | 7/2025 | Leider |
| 2001/0055985 | A1 | 12/2001 | Matt et al. |
| 2003/0030597 | A1 | 2/2003 | Geist |
| 2005/0033571 | A1 | 2/2005 | Huang |
| 2005/0069852 | A1 | 3/2005 | Janakiraman et al. |
| 2006/0023158 | A1 | 2/2006 | Howell et al. |
| 2006/0072767 | A1 | 4/2006 | Zhang et al. |
| 2006/0098827 | A1 | 5/2006 | Paddock et al. |
| 2006/0178876 | A1 | 8/2006 | Sato et al. |
| 2007/0225982 | A1 | 9/2007 | Washio |
| 2008/0124690 | A1 | 5/2008 | Redlich |
| 2008/0201138 | A1 | 8/2008 | Visser et al. |
| 2009/0180626 | A1 | 7/2009 | Nakano |
| 2010/0245585 | A1 | 9/2010 | Fisher et al. |
| 2010/0323652 | A1 | 12/2010 | Visser et al. |
| 2011/0211056 | A1 | 9/2011 | Publicover et al. |
| 2011/0213664 | A1 | 9/2011 | Osterhout |
| 2011/0238407 | A1 | 9/2011 | Kent |
| 2011/0288860 | A1 | 11/2011 | Schevciw et al. |
| 2012/0021806 | A1 | 1/2012 | Maltz |
| 2012/0130713 | A1 | 5/2012 | Shin et al. |
| 2012/0209601 | A1 | 8/2012 | Jing |
| 2013/0077147 | A1 | 3/2013 | Efimov |
| 2013/0204607 | A1 | 8/2013 | Baker, IV |
| 2013/0226589 | A1 * | 8/2013 | Largey ............... G10L 25/48 704/E21.001 |
| 2013/0236040 | A1 | 9/2013 | Crawford |
| 2013/0339028 | A1 | 12/2013 | Rosner et al. |
| 2014/0016793 | A1 | 1/2014 | Gardner |
| 2014/0194702 | A1 | 7/2014 | Tran |
| 2014/0195918 | A1 | 7/2014 | Friedlander |
| 2014/0200887 | A1 | 7/2014 | Nakadai et al. |
| 2014/0222430 | A1 | 8/2014 | Rao |
| 2014/0270202 | A1 | 9/2014 | Ivanov et al. |
| 2014/0270244 | A1 | 9/2014 | Fan |
| 2014/0310595 | A1 | 10/2014 | Acharya et al. |
| 2014/0337023 | A1 | 11/2014 | Mcculloch et al. |
| 2014/0379336 | A1 | 12/2014 | Bhatnagar |
| 2015/0006181 | A1 | 1/2015 | Fan et al. |
| 2015/0168731 | A1 | 6/2015 | Robbins |
| 2015/0310857 | A1 | 10/2015 | Habets et al. |
| 2015/0348572 | A1 | 12/2015 | Thornburg et al. |
| 2016/0019910 | A1 | 1/2016 | Faubel et al. |
| 2016/0066113 | A1 | 3/2016 | Elkhatib et al. |
| 2016/0112817 | A1 | 4/2016 | Fan et al. |
| 2016/0142830 | A1 | 5/2016 | Hu |
| 2016/0165340 | A1 | 6/2016 | Benattar |
| 2016/0180837 | A1 | 6/2016 | Gustavsson |
| 2016/0216130 | A1 | 7/2016 | Abramson et al. |
| 2016/0217781 | A1 | 7/2016 | Zhong et al. |
| 2016/0284350 | A1 | 9/2016 | Yun et al. |
| 2016/0358598 | A1 | 12/2016 | Williams et al. |
| 2016/0379629 | A1 | 12/2016 | Hofer et al. |
| 2016/0379632 | A1 | 12/2016 | Hoffmeister et al. |
| 2016/0379638 | A1 | 12/2016 | Basye et al. |
| 2017/0078819 | A1 | 3/2017 | Habets |
| 2017/0091169 | A1 | 3/2017 | Bellegarda |
| 2017/0092276 | A1 | 3/2017 | Sun et al. |
| 2017/0110116 | A1 | 4/2017 | Tadpatrikar et al. |
| 2017/0148429 | A1 | 5/2017 | Hayakawa |
| 2017/0270919 | A1 | 9/2017 | Parthasarathi et al. |
| 2017/0280239 | A1 | 9/2017 | Sekiya |
| 2017/0316780 | A1 | 11/2017 | Lovitt |
| 2017/0330555 | A1 | 11/2017 | Kawano |
| 2017/0332187 | A1 | 11/2017 | Lin |
| 2018/0011534 | A1 | 1/2018 | Poulos et al. |
| 2018/0053284 | A1 | 2/2018 | Rodriguez et al. |
| 2018/0077095 | A1 | 3/2018 | Deyle et al. |
| 2018/0129469 | A1 | 5/2018 | Vennström et al. |
| 2018/0227665 | A1 | 8/2018 | Elko et al. |
| 2018/0316939 | A1 | 11/2018 | Todd |
| 2018/0336902 | A1 | 11/2018 | Cartwright et al. |
| 2018/0349946 | A1 | 12/2018 | Nguyen |
| 2018/0358021 | A1 | 12/2018 | Mistica et al. |
| 2018/0366114 | A1 | 12/2018 | Anbazhagan et al. |
| 2019/0129944 | A1 | 5/2019 | Kawano |
| 2019/0362704 | A1 * | 11/2019 | Nicolis ............... G10L 13/10 |
| 2019/0362741 | A1 | 11/2019 | Li et al. |
| 2019/0373362 | A1 | 12/2019 | Ansai et al. |
| 2019/0392641 | A1 | 12/2019 | Taylor |
| 2020/0027455 | A1 | 1/2020 | Sugiyama et al. |
| 2020/0064921 | A1 | 2/2020 | Kang et al. |
| 2020/0142665 | A1 | 5/2020 | Dantrey et al. |
| 2020/0194028 | A1 | 6/2020 | Lipman |
| 2020/0213729 | A1 | 7/2020 | Soto |
| 2020/0279552 | A1 | 9/2020 | Piersol et al. |
| 2020/0279561 | A1 * | 9/2020 | Sheeder ............... G06F 3/0346 |
| 2020/0286465 | A1 | 9/2020 | Wang et al. |
| 2020/0296521 | A1 | 9/2020 | Wexler et al. |
| 2020/0335128 | A1 | 10/2020 | Sheeder et al. |
| 2021/0056966 | A1 | 2/2021 | Bilac et al. |
| 2021/0125609 | A1 | 4/2021 | Dusan et al. |
| 2021/0192413 | A1 | 6/2021 | Shirazipour |
| 2021/0264931 | A1 | 8/2021 | Leider |
| 2021/0306751 | A1 | 9/2021 | Roach et al. |
| 2022/0230658 | A1 | 7/2022 | Lee et al. |
| 2023/0135768 | A1 | 5/2023 | Sheeder et al. |
| 2023/0410835 | A1 | 12/2023 | Lee |
| 2024/0087565 | A1 | 3/2024 | Sheeder |
| 2024/0087587 | A1 | 3/2024 | Leider |
| 2024/0163612 | A1 | 5/2024 | Roach |
| 2024/0420718 | A1 | 12/2024 | Audfray |
| 2025/0006219 | A1 | 1/2025 | Lee |

(56) References Cited

U.S. PATENT DOCUMENTS

| | | | |
|---|---|---|---|
| 2025/0157471 A1 | 5/2025 | Sheeder et al. | |
| 2025/0168567 A1 | 5/2025 | Roach et al. | |
| 2025/0225971 A1 | 7/2025 | Vondersaar et al. | |

FOREIGN PATENT DOCUMENTS

| | | | |
|---|---|---|---|
| CA | 2388766 A1 | 12/2003 | |
| CA | 2304900 C | 5/2006 | |
| CN | 105529033 A | 4/2016 | |
| EP | 2950307 A1 | 12/2015 | |
| EP | 3211918 A1 | 8/2017 | |
| EP | 3716038 A1 | 9/2020 | |
| JP | S52144205 A | 12/1977 | |
| JP | 06075588 A | 3/1994 | |
| JP | 2000148184 A | 5/2000 | |
| JP | 2000261534 A | 9/2000 | |
| JP | 2002135173 A | 5/2002 | |
| JP | 2003264883 A | 9/2003 | |
| JP | 2005196134 A | 7/2005 | |
| JP | 2008242067 A | 10/2008 | |
| JP | 2010273305 A | 12/2010 | |
| JP | 2013183358 A | 9/2013 | |
| JP | 2014137405 A | 7/2014 | |
| JP | 2014178339 A | 9/2014 | |
| JP | 2016004270 A | 1/2016 | |
| JP | 2017211596 A | 11/2017 | |
| JP | 2018523156 A | 8/2018 | |
| JP | 2018179954 A | 11/2018 | |
| WO | 2014113891 A1 | 7/2014 | |
| WO | 2014159581 A1 | 10/2014 | |
| WO | 2015169618 A1 | 11/2015 | |
| WO | 2016063587 A1 | 4/2016 | |
| WO | 2016151956 A1 | 9/2016 | |
| WO | 2016153712 A1 | 9/2016 | |
| WO | 2017003903 A1 | 1/2017 | |
| WO | 2017017591 A1 | 2/2017 | |
| WO | 2017191711 A1 | 11/2017 | |
| WO | 2018163648 A1 | 9/2018 | |
| WO | 2019224292 A1 | 11/2019 | |
| WO | 2020180719 A1 | 9/2020 | |
| WO | 2020214844 A1 | 10/2020 | |
| WO | 2022072752 A1 | 4/2022 | |
| WO | 2023064875 A1 | 4/2023 | |

OTHER PUBLICATIONS

Final Office Action mailed Jan. 23, 2024, for U.S. Appl. No. 16/850,965, filed Apr. 16, 2020, fifteen pages.
Japanese Notice of Allowance mailed Dec. 15, 2023, for JP Application No. 2020571488, with English translation, eight pages.
Japanese Office Action mailed Jan. 30, 2024, for JP Application No. 2021-551538, with English translation, sixteen pages.
Notice of Allowance mailed Dec. 15, 2023, for U.S. Appl. No. 17/214,446, filed Mar. 26, 2021, seven pages.
International Preliminary Report and Written Opinion mailed Apr. 25, 2024, for PCT Application No. PCT/US2022/078063, seven pages.
International Preliminary Report on Patentability and Written Opinion mailed Apr. 25, 2024, for PCT Application No. PCT/US2022/078073, seven pages.
International Preliminary Report on Patentability and Written Opinion mailed May 2, 2024, for PCT Application No. PCT/US2022/078298, twelve pages.
International Search Report and Written Opinion mailed Jan. 11, 2023, for PCT Application No. PCT/US2022/078298, seventeen pages.
International Search Report and Written Opinion mailed Jan. 17, 2023, for PCT Application No. PCT/US2022/078073, thirteen pages.
International Search Report and Written Opinion mailed Jan. 25, 2023, for PCT Application No. PCT/US2022/078063, nineteen pages.
Japanese Office Action mailed May 2, 2024, for JP Application No. 2021-562002, with English translation, sixteen pages.
Notice of Allowance mailed Jun. 5, 2024, for U.S. Appl. No. 18/459,342, filed Aug. 31, 2023, eight pages.
Final Office Action mailed Apr. 10, 2023, for U.S. Appl. No. 16/850,965, filed Apr. 16, 2020, sixteen pages.
International Preliminary Report and Written Opinion mailed Apr. 13, 2023, for PCT Application No. PCT/US2021/53046, filed Sep. 30, 2021, nine pages.
Non-Final Office Action mailed Apr. 12, 2023, for U.S. Appl. No. 17/214,446, filed Mar. 26, 2021, seventeen pages.
Non-Final Office Action mailed Apr. 13, 2023, for U.S. Appl. No. 17/714,708, filed Apr. 6, 2022, sixteen pages.
Non-Final Office Action mailed Apr. 27, 2023, for U.S. Appl. No. 17/254,832, filed Dec. 21, 2020, fourteen pages.
Non-Final Office Action mailed Nov. 6, 2024, for U.S. Appl. No. 16/850,965, filed Apr. 16, 2020, twenty pages.
European Office Action dated Jun. 1, 2023, for EP Application No. 19822754.8, six pages.
Final Office Action mailed Sep. 7, 2023, for U.S. Appl. No. 17/214,446, filed Mar. 26, 2021, nineteen pages.
Non-Final Office Action mailed Sep. 15, 2023, for U.S. Appl. No. 16/850,965, filed Apr. 16, 2020, fourteen pages.
Notice of Allowance mailed Oct. 12, 2023, for U.S. Appl. No. 18/148,221, filed Dec. 29, 2022, five pages.
Notice of Allowance mailed Oct. 17, 2023, for U.S. Appl. No. 17/254,832, filed Dec. 21, 2020, sixteen pages.
European Office Action dated Dec. 12, 2023, for EP Application No. 20766540.7, four pages.
Non-Final Office Action mailed Mar. 27, 2024, for U.S. Appl. No. 16/850,965, filed Apr. 16, 2020, sixteen pages.
European Notice of Allowance dated Jul. 15, 2024, for EP Application No. 20791183.5 nine pages.
Final Office Action mailed Jul. 17, 2024, for U.S. Appl. No. 16/850,965, filed Apr. 16, 2020, seventeen pages.
Japanese Final Office Action mailed May 31, 2024, for JP Application No. 2021-551538, with English translation, eighteen pages.
Japanese Notice of Allowance mailed Aug. 21, 2024, for JP Application No. 2021-562002, with English translation, six pages.
Non-Final Office Action mailed Aug. 26, 2024, for U.S. Appl. No. 18/418,131, filed Jan. 19, 2024, ten pages.
Non-Final Office Action mailed Aug. 26, 2024, for U.S. Appl. No. 18/506,866, filed Nov. 10, 2023, twelve pages.
Japanese Notice of Allowance mailed Oct. 28, 2024, for JP Application No. 2021-551538 with English translation, 6 pages.
Backstrom, T. (Oct. 2015). "Voice Activity Detection Speech Processing," Aalto University, vol. 58, No. 10; Publication [online], retrieved Apr. 19, 2020, retrieved from the Internet: URL: https://mycourses.aalto.fi/pluginfile.php/146209/mod_resource/content/1/slides_07_vad.pdf, ; pp. 1-36.
Bilac, M. et al. (Nov. 15, 2017). Gaze and Filled Pause Detection for Smooth Human-Robot Conversations. www.angelicalim.com, retrieved on Jun. 17, 2020, Retrieved from the internet URL: http://www.angelicalim.com/papers/humanoids2017_paper.pdf entire document, 8 pages.
European Search Report dated Nov. 12, 2021, for EP Application No. 19822754.8, ten pages.
European Search Report dated Nov. 21, 2022, for EP Application No. 20791183.5 nine pages.
European Search Report dated Oct. 6, 2022, for EP Application No. 20766540.7 nine pages.
Final Office Action mailed Apr. 15, 2022, for U.S. Appl. No. 16/850,965, filed Apr. 16, 2020, fourteen pages.
Final Office Action mailed Aug. 5, 2022, for U.S. Appl. No. 16/805,337, filed Feb. 28, 2020, eighteen pages.
Final Office Action mailed Jan. 11, 2023, for U.S. Appl. No. 17/214,446, filed Mar. 26, 2021, sixteen pages.
Final Office Action mailed Oct. 6, 2021, for U.S. Appl. No. 16/805,337, filed Feb. 28, 2020, fourteen pages.
Harma, A. et al. (Jun. 2004). "Augmented Reality Audio for Mobile and Wearable Appliances," J. Audio Eng. Soc., vol. 52, No. 6, retrieved on Aug. 20, 2019, Retrieved from the Internet: URL:https://

(56) References Cited

OTHER PUBLICATIONS pdfs.semanticscholar.org/ae54/82c6a8d4add3e9707d780dfb5ce03d8e0120.pdf , 22 pages.

International Preliminary Report and Patentability mailed Dec. 22, 2020, for PCT Application No. PCT/US2019/038546, 13 pages.

International Preliminary Report and Written Opinion mailed Oct. 28, 2021, for PCT Application No. PCT/US2020/028570, filed Apr. 16, 2020, 17 pages.

International Preliminary Report and Written Opinion malled Sep. 16, 2021, for PCT Application No. PCT/US20/20469, filed Feb. 28, 2020, nine pages.

International Search Report and Written Opinion mailed Jul. 2, 2020, for PCT Application No. PCT/US2020/028570, filed Apr. 16, 2020, nineteen pages.

International Search Report and Written Opinion mailed May 18, 2020, for PCT Application No. PCT/US20/20469, filed Feb. 28, 2020, twenty pages.

International Search Report and Written Opinion mailed Sep. 17, 2019, for PCT Application No. PCT/US2019/038546, sixteen pages.

Jacob, R. "Eye Tracking in Advanced Interface Design", Virtual Environments and Advanced Interface Design, Oxford University Press, Inc. (Jun. 1995).

Kitayama, K. et al. (Sep. 30, 2003). "Speech Starter: Noise-Robust Endpoint Detection by Using Filled Pauses." Eurospeech 2003, retrieved on Jun. 17, 2020, retrieved from the internet URL: http://clteseerx.ist.psu.edu/viewdoc/download? doi=10 . 1.1.141. 1472&rep=rep1&type=pdf entire document, pp. 1237-1240.

Liu, Baiyang, et al.: (Sep. 6, 2015). "Accurate Endpointing with Expected Pause Duration," Interspeech 2015, pp. 2912-2916, retrieved from: a href="https://scholar.google.com/scholar?q=BAIYANGtarget="_blank"https://scholar.google.com/scholar?q=BAIYANG/a,+Liu+et+al.:+(September+6,+2015).+"Accurate+endpointing+with+expected+pause+duration,&hl=en&as_sdt=0&as_vis=1&oi=scholart.

Non-Final Office Action malled Aug. 10, 2022, for U.S. Appl. No. 17/214,446, filed Mar. 26, 2021, fifteen pages.

Non-Final Office Action mailed Jun. 24, 2021, for U.S. Appl. No. 16/805,337, filed Feb. 28, 2020, fourteen pages.

Non-Final Office Action mailed Mar. 17, 2022, for U.S. Appl. No. 16/805,337, filed Feb. 28, 2020, sixteen pages.

Non-Final Office Action mailed Nov. 17, 2021, for U.S. Appl. No. 16/987,267, filed Aug. 6, 2020, 21 pages.

Non-Final Office Action mailed Oct. 4, 2021, for U.S. Appl. No. 16/850,965, filed Apr. 16, 2020, twelve pages.

Non-Final Office Action mailed Sep. 29, 2022, for U.S. Appl. No. 16/850,965, filed Apr. 16, 2020, fifteen pages.

Notice of Allowance mailed Mar. 3, 2022, for U.S. Appl. No. 16/987,267, filed Aug. 6, 2020, nine pages.

Notice of Allowance mailed Nov. 30, 2022, for U.S. Appl. No. 16/805,337, filed Feb. 28, 2020, six pages.

Rolland, J. et al., "High-resolution inset head-mounted display", Optical Society of America, vol. 37, No. 19, Applied Optics, (Jul. 1, 1998).

Shannon, Matt et al. (Aug. 20-24, 2017). "Improved End-of-Query Detection for Streaming Speech Recognition", Interspeech 2017, Stockholm, Sweden, pp. 1909-1913.

Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.

Tonges, R. (Dec. 2015). "An augmented Acoustics Demonstrator with Realtime stereo up-mixing and Binaural Auralization," Technische University Berlin, Audio Communication Group, retrieved on Aug. 22, 2019, Retrieved from the Internet: URL: https://www2.ak.tu-berlin.de/~akgroup/ak_pub/abschlussarbeiten/2015/ToengesRaffael_MasA.pdf 100 pages.

Yoshida, A. et al., "Design and Applications of a High Resolution Insert Head Mounted Display", (Jun. 1994).

Chinese Office Action dated Jun. 2, 2023, for CN Application No. 2020-571488, with English translation, 9 pages.

Non-Final Office Action mailed Jun. 23, 2023, for U.S. Appl. No. 18/148,221, filed Dec. 29, 2022, thirteen pages.

Notice of Allowance mailed Jul. 31, 2023, for U.S. Appl. No. 17/714,708, filed Apr. 6, 2022, eight pages.

Final Office Action mailed Aug. 4, 2023, for U.S. Appl. No. 17/254,832, filed Dec. 21, 2020, seventeen pages.

Chinese Office Action dated Feb. 12, 2025, for CN Application No. 202080031993.2, with English translation, 18 pages.

European Search Report dated May 14, 2025, for EP Application No. 22884642.4, thirteen pages.

Japanese Office Action mailed Apr. 16, 2025, for JP Application No. 2023-142856, with English translation, 6 pages.

Notice of Allowance (corrected) mailed May 7, 2025, for U.S. Appl. No. 16/850,965, filed Apr. 16, 2020, seven pages.

Notice of Allowance mailed Apr. 2, 2025, for U.S. Appl. No. 16/850,965, filed Apr. 16, 2020, ten pages.

Notice of Allowance mailed Apr. 25, 2025, for U.S. Appl. No. 18/510,376, filed Nov. 15, 2023, eight pages.

Chinese Notice of Allowance dated Feb. 18, 2025, for CN Application No. 202080044362.4, with English translation, 7 pages.

Chinese Notice of Allowance dated Nov. 7, 2024, for CN Application No. 201980050714.4, with English translation, 6 pages.

European Search Report dated Jan. 20, 2025, for EP Application No. 24221982.2 nine pages.

Hatashima, Takashi et al. "A study on a subband acoustic echo chaceller using a single microphone, Institute of Electronics, Information and Communication Engineers technical research report", Feb. 1995, vol. 94, No. 522, p. 1-8 (document showing a well-known technique). Note: An English language abstract can be found on the cover page of this reference.

Japanese Office Action mailed Nov. 7, 2024, for JP Application No. 2023-142856, with English translation, 12 pages.

Kaushik, Mayank, et al. "Three Dimensional Microphone and Source Position Estimation Using TDOA and TOF Measurements."2011 IEEE International Conference on Signal Processing, Communications and Computing (ICSPCC). IEEE, 2011. (Year: 2011).

Non-Final Office Action mailed Jan. 24, 2025, for U.S. Appl. No. 18/510,376, filed Nov. 15, 2023, seventeen pages.

Notice of Allowance mailed Dec. 11, 2024, for U.S. Appl. No. 18/418,131, filed Jan. 19, 2024, seven pages.

Notice of Allowance mailed Dec. 19, 2024, for U.S. Appl. No. 18/506,866, filed Nov. 10, 2023, five pages.

* cited by examiner

VOICE USER INTERFACE USING NON-LINGUISTIC INPUT

CROSS REFERENCE TO RELATED APPLICATIONS

This Application is a national stage application under 35 U.S.C. § 371 of International Application No. PCT/US2021/053046, filed internationally on Sep. 30, 2021, which claims the benefit of U.S. Provisional Application No. 63/085,462 filed on Sep. 30, 2020, the entire disclosure of which is herein incorporated by reference for all purposes.

FIELD

This disclosure relates in general to systems and methods for operating a voice user interface configured to receive and process linguistic and non-linguistic inputs.

BACKGROUND

Voice user interfaces (VUIs) may employ automatic speech recognition (ASR) (e.g., speech-to-text) coupled with a semantic model that maps spoken natural language (e.g., "please email Frank that I'll be late to the meeting") into intents and values (e.g., INTENT="SEND_EMAIL," RECIPIENT="Frank", BODY="I'll be late to the meeting"). Such utterances are often preceded by a Wake-Up Word (WuW), which instructs a speech system to wake from sleep and prepare to parse a user's utterance. This model may be used for systems such as home assistants, appliances, personal robots, and IoT devices, in which a substantially immediate or real-time response may not be critical.

However, some scenarios may require a more immediate response and action (e.g., taking a photograph, recording a video, recording an audio). For example, VUI-enabled cameras and head-mounted augmented reality (AR) or mixed reality (MR) devices may need to be activated quickly to record a video or take a picture using a voice input, when activating such operation may not be convenient (e.g., a picture of a patient at a specific time need to be taken during surgery, a video of a MR environment need to be recorded during game play). In these cases, by the time a WuW is uttered and followed by a voice command (e.g., "take a picture") or a combination of inputs is entered on a device, too much time may have lapsed to capture a desired picture or recording. Furthermore, the time it takes to indicate certain actions may be unnecessarily long. This may also be the case, for example, with issuing graphical communication memes, such as emojis, which are increasingly prevalent in communication. Evoking an emoji in a message may require one to either change the layout of a virtual keyboard and search for the desired emoji, or to remember and type a corresponding control sequence, which may complicated, (e.g., "/smileyface" or ":-)" that is then mapped to an emoji character).

In some scenarios, text-based communication (e.g., text, chat, email) using speech recognition may not convey subtleties of a sender's underlying emotion and/or intent. For example, if a sender sends a message intended to be a joke, the humor may be lost at the receiver's end because the words of the message themselves may not convey the sender's intentions.

For these reasons, it would be desirable to improve the voice user interface to allow for quicker response and action on a device and convey a sender's underlying emotion and/or intent.

BRIEF SUMMARY

A voice user interface (VUI) and methods for operating the VUI are disclosed. In some embodiments, the VUI configured to receive and process linguistic and non-linguistic inputs. For example, the VUI receives an audio signal, and the VUI determines whether the audio input comprises a linguistic and/or a non-linguistic input. In accordance with a determination that the audio signal comprises a non-linguistic input, the VUI causes a system to perform an action associated with the non-linguistic input. For example, the non-linguistic input may be one of a paralinguistic input and a prosodic input. As an exemplary advantage, the VUI is able to respond to time-critical commands much closer to real-time than is possible with natural-language processing (NLP) systems.

In some embodiments, a method comprises: receiving, using a microphone of a system, an audio signal; determining whether the audio signal comprises a non-linguistic input; and in accordance with a determination that the audio signal comprises the non-linguistic input, performing an action associated with the non-linguistic input.

In some embodiments, the non-linguistic input is a paralinguistic input, and in accordance with a determination that the audio signal comprises the paralinguistic input, the action comprises a first action associated with the paralinguistic input.

In some embodiments, the non-linguistic input is a prosodic input, and in accordance with a determination that the audio signal comprises the prosodic input, the action comprises a second action associated with the prosodic input.

In some embodiments, the second action is a modification of an action associated with a linguistic input.

In some embodiments, the prosodic input is indicative of an emotion associated with a user of the system, the user of the system associated with the audio signal, and the action is further associated with the emotion.

In some embodiments, the method further comprises: determining whether the audio signal comprises a linguistic input; and in accordance with a determination that the audio signal comprises the linguistic input, performing a third action associated with the linguistic input.

In some embodiments, the action comprises a modification of the third action based on the non-linguistic input.

In some embodiments, the method further comprises in accordance with a determination that the audio signal comprises the non-linguistic input, receiving information associated with the audio signal from a convolutional neural network, wherein the action is performed based on the information.

In some embodiments, the method further comprises classifying a feature of the non-linguistic input, wherein the action is performed based on the classified feature.

In some embodiments, the method further comprises associating the action with the non-linguistic input.

In some embodiments, the action comprises one of texting, performing an intent, and inserting an emoji.

In some embodiments, the method further comprises receiving, from a sensor of the system different from the microphone, information associated with an environment of the system, wherein the action is further associated with the information received from the sensor.

In some embodiments, the system is a mixed reality system in a mixed reality environment, and the action is further associated with the mixed reality environment.

In some embodiments, the method further comprises determining a position of the system, wherein the action is further associated with the position of the system.

In some embodiments, in accordance with a determination that the system is associated with a first user, the action comprises a first action associated with the first user; and in accordance with a determination that the system is associated with a second user, different from the first user, the action comprises a second action associated with the second user, different from the first action.

In some embodiments, the audio signal comprises a frequency-domain feature and a time-domain feature, and the determination of whether the audio comprises the non-linguistic input is based on the frequency-domain feature and the time-domain feature.

In some embodiments, the method further comprises receiving information from a feature database, wherein the determination of whether the audio comprises the non-linguistic input is further based on the information.

In some embodiments, determining whether the audio signal comprises the non-linguistic input comprises using a first processor, and the method further comprises in accordance with a determination that the audio signal comprises the non-linguistic input, waking up a second processor to perform the action.

In some embodiments, a system comprises: a microphone; and one or more processors configured to execute a method comprising: receiving, using the microphone, an audio signal; determining whether the audio signal comprises a non-linguistic input; and in accordance with a determination that the audio signal comprises the non-linguistic input, performing an action associated with the non-linguistic input.

In some embodiments, the non-linguistic input is a paralinguistic input, and in accordance with a determination that the audio signal comprises the paralinguistic input, the action comprises a first action associated with the paralinguistic input.

In some embodiments, the non-linguistic input is a prosodic input, and in accordance with a determination that the audio signal comprises the prosodic input, the action comprises a second action associated with the prosodic input.

In some embodiments, the second action is a modification of an action associated with a linguistic input.

In some embodiments, the prosodic input is indicative of an emotion associated with a user of the system, the user of the system associated with the audio signal, and the action is further associated with the emotion.

In some embodiments, the method further comprises: determining whether the audio signal comprises a linguistic input; and in accordance with a determination that the audio signal comprises the linguistic input, performing a third action associated with the linguistic input.

In some embodiments, the action comprises a modification of the third action based on the non-linguistic input.

In some embodiments, the method further comprises in accordance with a determination that the audio signal comprises the non-linguistic input, receiving information associated with the audio signal from a convolutional neural network, wherein the action is performed based on the information.

In some embodiments, the method further comprises classifying a feature of the non-linguistic input, wherein the action is performed based on the classified feature.

In some embodiments, the method further comprises associating the action with the non-linguistic input.

In some embodiments, the action comprises one of texting, performing an intent, and inserting an emoji.

In some embodiments, the system further comprises a sensor different from the microphone, wherein the method further comprises receiving, from the sensor, information associated with an environment of the system, wherein the action is further associated with the information received from the sensor.

In some embodiments, the system is a mixed reality system in a mixed reality environment, and the action is further associated with the mixed reality environment.

In some embodiments, the method further comprises determining a position of the system, wherein the action is further associated with the position of the system.

In some embodiments, in accordance with a determination that the system is associated with a first user, the action comprises a first action associated with the first user; and in accordance with a determination that the system is associated with a second user, different from the first user, the action comprises a second action associated with the second user, different from the first action.

In some embodiments, the audio signal comprises a frequency-domain feature and a time-domain feature, and the determination of whether the audio comprises the non-linguistic input is based on the frequency-domain feature and the time-domain feature.

In some embodiments, the method further comprises receiving information from a feature database, wherein the determination of whether the audio comprises the non-linguistic input is further based on the information.

In some embodiments, determining whether the audio signal comprises the non-linguistic input comprises using a first processor, and the method further comprises in accordance with a determination that the audio signal comprises the non-linguistic input, waking up a second processor to perform the action.

In some embodiments, a non-transitory computer-readable medium storing instructions that, when executed by one or more processors, cause the one or more processors to execute a method comprising: receiving, using a microphone of a system, an audio signal; determining whether the audio signal comprises a non-linguistic input; and in accordance with a determination that the audio signal comprises the non-linguistic input, performing an action associated with the non-linguistic input.

In some embodiments, the non-linguistic input is a paralinguistic input, and in accordance with a determination that the audio signal comprises the paralinguistic input, the action comprises a first action associated with the paralinguistic input.

In some embodiments, the non-linguistic input is a paralinguistic input, and in accordance with a determination that the audio signal comprises the paralinguistic input, the action comprises a first action associated with the paralinguistic input.

In some embodiments, the non-linguistic input is a prosodic input, and in accordance with a determination that the audio signal comprises the prosodic input, the action comprises a second action associated with the prosodic input.

In some embodiments, the second action is a modification of an action associated with a linguistic input.

In some embodiments, the prosodic input is indicative of an emotion associated with a user of the system, the user of the system associated with the audio signal, and the action is further associated with the emotion.

In some embodiments, the method further comprises: determining whether the audio signal comprises a linguistic input; and in accordance with a determination that the audio signal comprises the linguistic input, performing a third action associated with the linguistic input.

In some embodiments, the action comprises a modification of the third action based on the non-linguistic input.

In some embodiments, the method further comprises in accordance with a determination that the audio signal comprises the non-linguistic input, receiving information associated with the audio signal from a convolutional neural network, wherein the action is performed based on the information.

In some embodiments, the method further comprises classifying a feature of the non-linguistic input, wherein the action is performed based on the classified feature.

In some embodiments, the method further comprises associating the action with the non-linguistic input.

In some embodiments, the action comprises one of texting, performing an intent, and inserting an emoji.

In some embodiments, the method further comprises receiving, from a sensor of the system different from the microphone, information associated with an environment of the system, wherein the action is further associated with the information received from the sensor.

In some embodiments, the system is a mixed reality system in a mixed reality environment, and the action is further associated with the mixed reality environment.

In some embodiments, the method further comprises determining a position of the system, wherein the action is further associated with the position of the system.

In some embodiments, in accordance with a determination that the system is associated with a first user, the action comprises a first action associated with the first user; and in accordance with a determination that the system is associated with a second user, different from the first user, the action comprises a second action associated with the second user, different from the first action.

In some embodiments, the audio signal comprises a frequency-domain feature and a time-domain feature, and the determination of whether the audio comprises the non-linguistic input is based on the frequency-domain feature and the time-domain feature.

In some embodiments, the method further comprises receiving information from a feature database, wherein the determination of whether the audio comprises the non-linguistic input is further based on the information.

In some embodiments, determining whether the audio signal comprises the non-linguistic input comprises using a first processor, and the method further comprises in accordance with a determination that the audio signal comprises the non-linguistic input, waking up a second processor to perform the action.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Figure 1A:
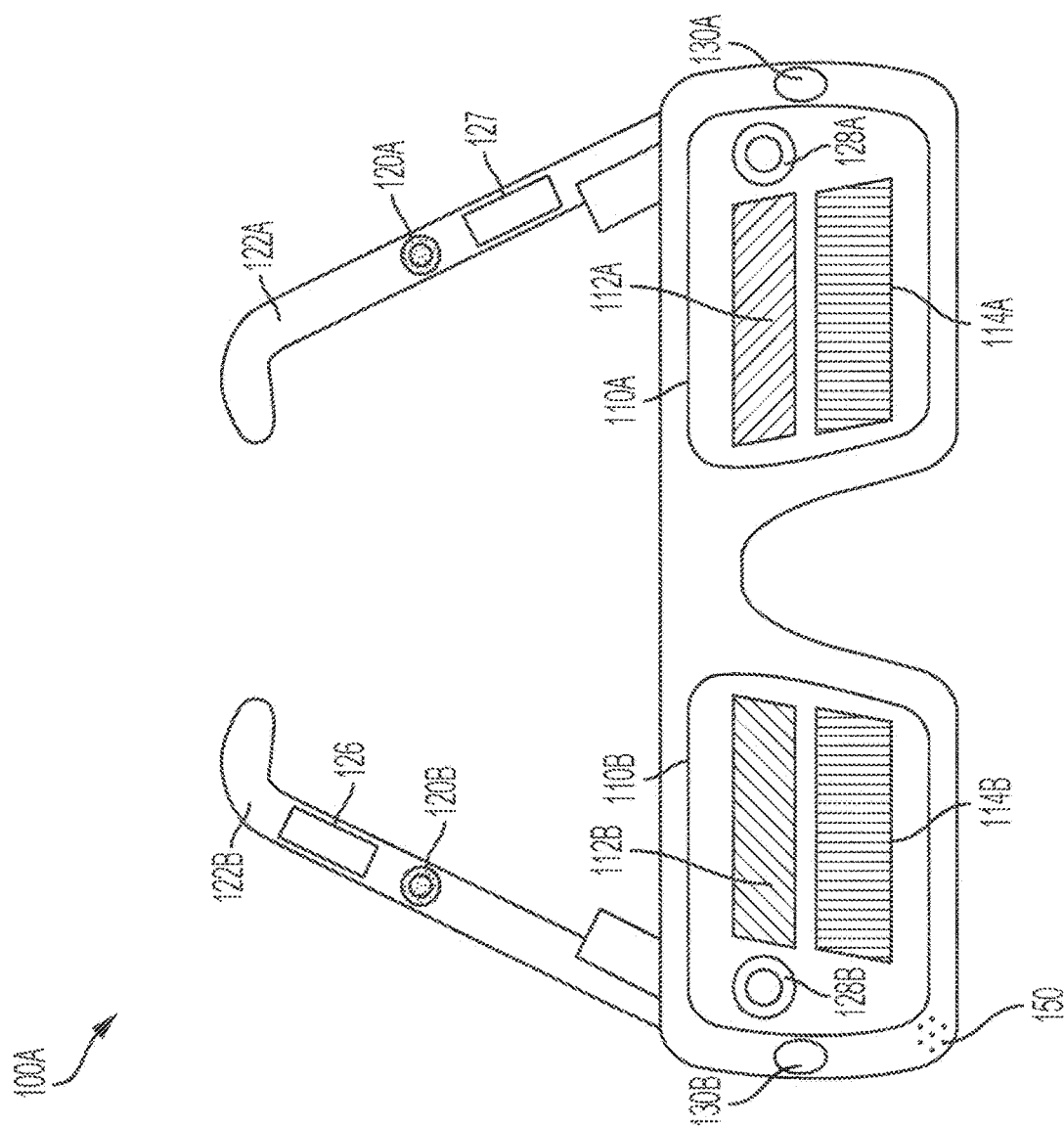
FIGS. 1A-1B illustrate exemplary wearable systems according to some embodiments of the disclosure.

FIG. 1A illustrates an example wearable head device 100A configured to be worn on the head of a user. Wearable head device 100A may be part of a broader wearable system that comprises one or more components, such as a head device (e.g., wearable head device 100A), a handheld controller (e.g., handheld controller 200 described below), and/or an auxiliary unit (e.g., auxiliary unit 300 described below). In some examples, wearable head device 100A can be used for virtual reality, augmented reality, or mixed reality systems or applications. Wearable head device 100A can comprise one or more displays, such as displays 110A and 110B (which may comprise left and right transmissive displays, and associated components for coupling light from the displays to the user's eyes, such as orthogonal pupil expansion (OPE) grating sets 112A/112B and exit pupil expansion (EPE) grating sets 114A/114B); left and right acoustic structures, such as speakers 120A and 120B (which may be mounted on temple arms 122A and 122B, and positioned adjacent to the user's left and right ears, respectively); one or more sensors such as infrared sensors, accelerometers, GPS units, inertial measurement units (IMUs, e.g. IMU 126), acoustic sensors (e.g., microphones 150); orthogonal coil electromagnetic receivers (e.g., receiver 127 shown mounted to the left temple arm 122A); left and right cameras (e.g., depth (time-of-flight) cameras 130A and 130B) oriented away from the user; and left and right eye cameras oriented toward the user (e.g., for detecting the user's eye movements)(e.g., eye cameras 128A and 128B). However, wearable head device 100A can incorporate any suitable display technology, and any suitable number, type, or combination of sensors or other components without departing from the scope of the invention. In some examples, wearable head device 100A may incorporate one or more microphones 150 configured to detect audio signals generated by the user's voice; such microphones may be positioned adjacent to the user's mouth and/or on one or both sides of the user's head. In some examples, the one or more microphones 150 may be configured to receive a voice input or an audio signal (e.g., voice input 502, voice input 602, voice input 702) for a voice user interface (e.g., VUI system 500, VUI system 700) of the wearable head device. In some examples, wearable head device 100A may incorporate networking features (e.g., Wi-Fi capability) to communicate with other devices and systems, including other wearable systems. Wearable head device 100A may further include components such as a battery, a processor, a memory, a storage unit, or various input devices (e.g., buttons, touchpads); or may be coupled to a handheld controller (e.g., handheld controller 200) or an auxiliary unit (e.g., auxiliary unit 300) that comprises one or more such components. In some examples, sensors may be configured to output a set of coordinates of the head-mounted unit relative to the user's environment, and may provide input to a processor performing a Simultaneous Localization and Mapping (SLAM) procedure and/or a visual odometry algorithm. In some examples, wearable head device 100A may be coupled to a handheld controller 200, and/or an auxiliary unit 300, as described further below.

Figure 1B:
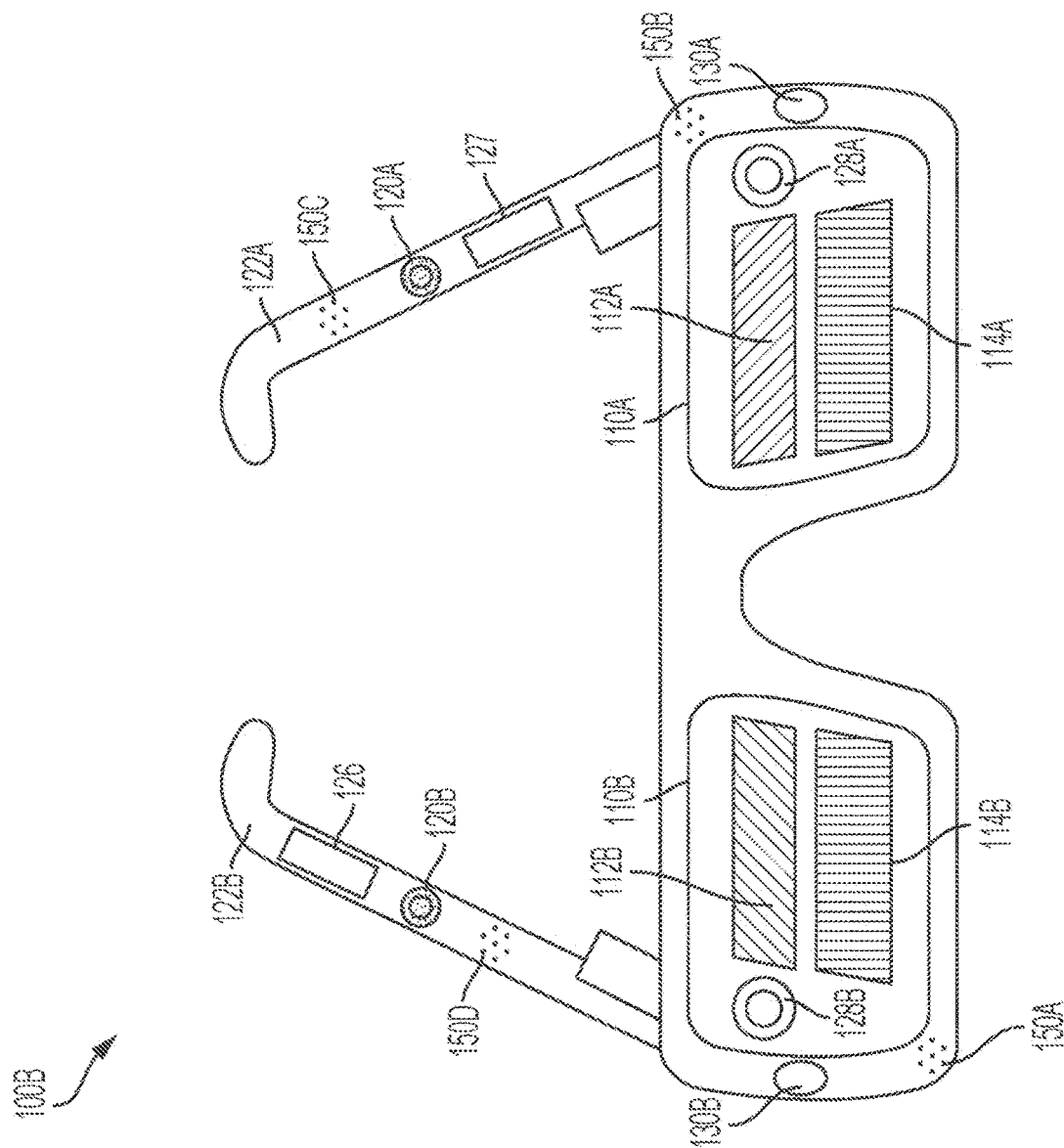

FIG. 1B illustrates an example wearable head device 100B (that can correspond to wearable head device 100A) configured to be worn on the head of a user. In some embodiments, wearable head device 100B can include a multi-microphone configuration, including microphones 150A, 150B, 150C, and 150D. In some examples, the one or more microphones 150 may be configured to receive a voice input or an audio signal (e.g., voice input 502, voice input 602, voice input 702) for a voice user interface (e.g., VUI system 500, VUI system 700) of the wearable head device. Multi-microphone configurations can provide spatial information about a sound source in addition to audio information. For example, signal processing techniques can be used to determine a relative position of an audio source to wearable head device 100B based on the amplitudes of the signals received at the multi-microphone configuration. If the same audio signal is received with a larger amplitude at microphone 150A than at 150B, it can be determined that the audio source is closer to microphone 150A than to microphone 150B. Asymmetric or symmetric microphone configurations can be used. In some embodiments, it can be advantageous to asymmetrically configure microphones 150A and 150B on a front face of wearable head device 100B. For example, an asymmetric configuration of microphones 150A and 150B can provide spatial information pertaining to height (e.g., a distance from a first microphone to a voice source (e.g., the user's mouth, the user's throat) and a second distance from a second microphone to the voice source are different). This can be used to distinguish a user's speech from other human speech. For example, a ratio of amplitudes received at microphone 150A and at microphone 150B can be expected for a user's mouth to determine that an audio source is from the user. In some embodiments, a symmetrical configuration may be able to distinguish a user's speech from other human speech to the left or right of a user. Although four microphones are shown in FIG. 1B, it is contemplated that any suitable number of microphones can be used, and the microphone(s) can be arranged in any suitable (e.g., symmetrical or asymmetrical) configuration.

Figure 2:
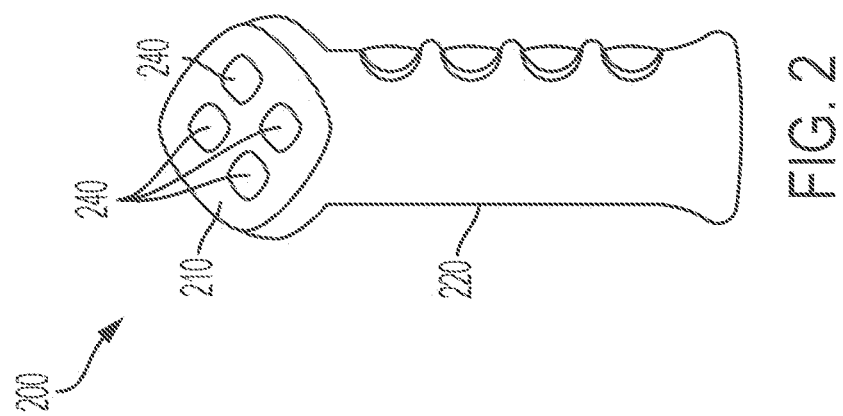
FIG. 2 illustrates an exemplary handheld controller according to some embodiments of the disclosure.

FIG. 2 illustrates an example mobile handheld controller component 200 of an example wearable system. In some examples, handheld controller 200 may be in wired or wireless communication with wearable head device 100A and/or 100B and/or auxiliary unit 300 described below. In some examples, handheld controller 200 includes a handle portion 220 to be held by a user, and one or more buttons 240 disposed along a top surface 210. In some examples, handheld controller 200 may be configured for use as an optical tracking target; for example, a sensor (e.g., a camera or other optical sensor) of wearable head device 100A and/or 100B can be configured to detect a position and/or orientation of handheld controller 200 which may, by extension, indicate a position and/or orientation of the hand of a user holding handheld controller 200. In some examples, handheld controller 200 may include a processor, a memory, a storage unit, a display, or one or more input devices, such as ones described herein. In some examples, handheld controller 200 includes one or more sensors (e.g., any of the sensors or tracking components described herein with respect to wearable head device 100A and/or 100B). In some examples, sensors can detect a position or orientation of handheld controller 200 relative to wearable head device 100A and/or 100B or to another component of a wearable system. In some examples, sensors may be positioned in handle portion 220 of handheld controller 200, and/or may be mechanically coupled to the handheld controller. Handheld controller 200 can be configured to provide one or more output signals, corresponding, for example, to a pressed state of the buttons 240; or a position, orientation, and/or motion of the handheld controller 200 (e.g., via an IMU). Such output signals may be used as input to a processor of wearable head device 100A and/or 100B, to auxiliary unit 300, or to another component of a wearable system. In some examples, handheld controller 200 can include one or more microphones to detect sounds (e.g., a user's speech, environmental sounds), and in some cases provide a signal corresponding to the detected sound to a processor (e.g., a processor of wearable head device 100A and/or 100B).

Figure 3:
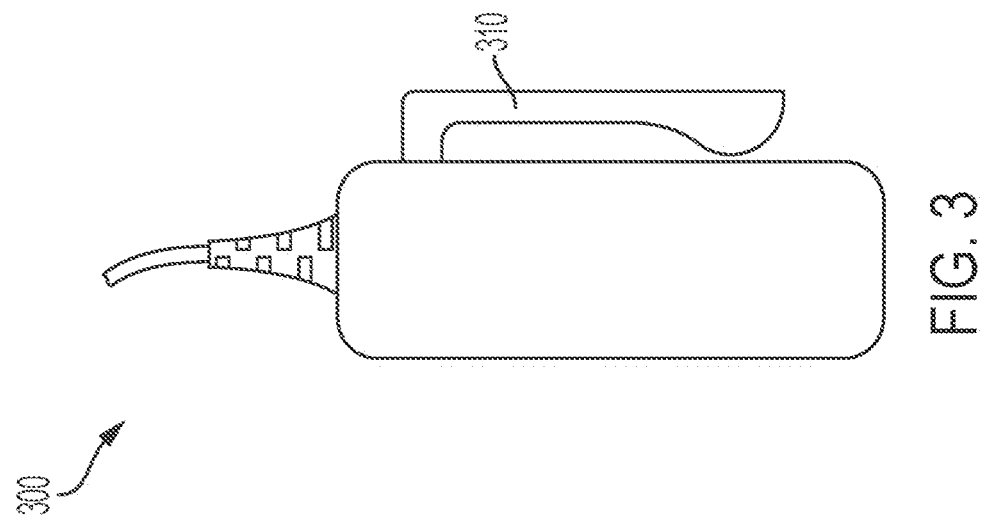
FIG. 3 illustrates an exemplary auxiliary unit according to some embodiments of the disclosure.

FIG. 3 illustrates an example auxiliary unit 300 of an example wearable system. In some examples, auxiliary unit 300 may be in wired or wireless communication with wearable head device 100A and/or 100B and/or handheld controller 200. The auxiliary unit 300 can include a battery to primarily or supplementally provide energy to operate one or more components of a wearable system, such as wearable head device 100A and/or 100B and/or handheld controller 200 (including displays, sensors, acoustic structures, processors, microphones, and/or other components of wearable head device 100A and/or 100B or handheld controller 200). In some examples, auxiliary unit 300 may include a processor, a memory, a storage unit, a display, one or more input devices, and/or one or more sensors, such as ones described herein. In some examples, auxiliary unit 300 includes a clip 310 for attaching the auxiliary unit to a user (e.g., attaching the auxiliary unit to a belt worn by the user). An advantage of using auxiliary unit 300 to house one or more components of a wearable system is that doing so may allow larger or heavier components to be carried on a user's waist, chest, or back—which are relatively well suited to support larger and heavier objects—rather than mounted to the user's head (e.g., if housed in wearable head device 100A and/or 100B) or carried by the user's hand (e.g., if housed in handheld controller 200). This may be particularly advantageous for relatively heavier or bulkier components, such as batteries.

Figure 4A:
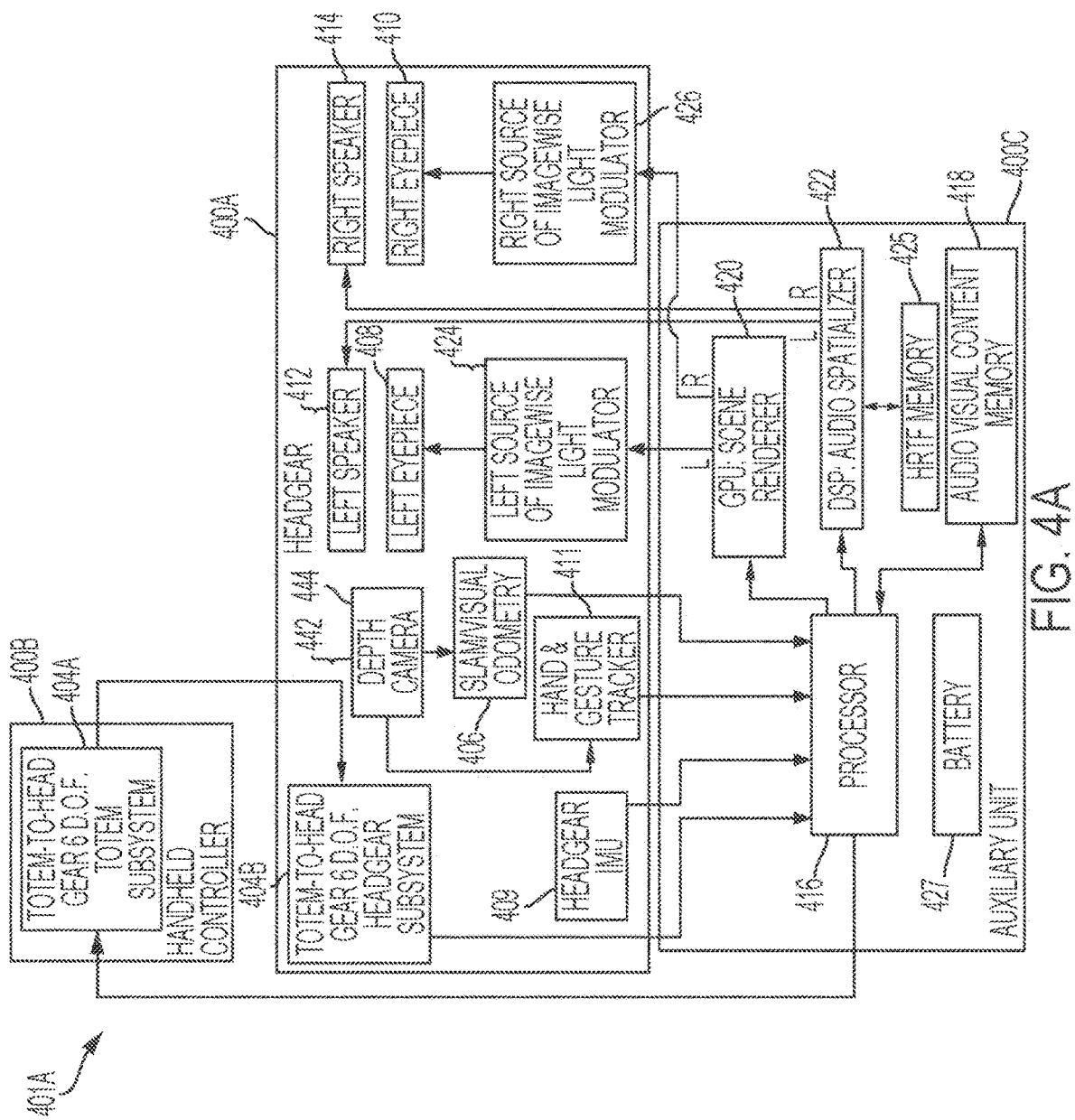
FIGS. 4A-4B illustrate exemplary functional block diagrams of an exemplary wearable system according to some embodiments of the disclosure.

FIG. 4A shows an example functional block diagram that may correspond to an example wearable system 401A; such system may include example wearable head device 100A and/or 100B, handheld controller 200, and auxiliary unit 300 described herein. In some examples, the wearable system 401A could be used for virtual reality, augmented reality, or mixed reality applications. As shown in FIG. 4, wearable system 401A can include example handheld controller 400B, referred to here as a "totem" (and which may correspond to handheld controller 200); the handheld controller 400B can include a totem-to-headgear six degree of freedom (6DOF) totem subsystem 404A. Wearable system 401A can also include example headgear device 400A (which may correspond to wearable head device 100A and/or 100B); the headgear device 400A includes a totem-to-headgear 6DOF headgear subsystem 404B. In the example, the 6DOF totem subsystem 404A and the 6DOF headgear subsystem 404B cooperate to determine six coordinates (e.g., offsets in three translation directions and rotation along three axes) of the handheld controller 400B relative to the headgear device 400A. The six degrees of freedom may be expressed relative to a coordinate system of the headgear device 400A. The three translation offsets may be expressed as X, Y, and Z offsets in such a coordinate system, as a translation matrix, or as some other representation. The rotation degrees of freedom may be expressed as sequence of yaw, pitch and roll rotations; as vectors; as a rotation matrix; as a quaternion; or as some other representation. In some examples, one or more depth cameras 444 (and/or one or more non-depth cameras) included in the headgear device 400A; and/or one or more optical targets (e.g., buttons 240 of handheld controller 200 as described, dedicated optical targets included in the handheld controller) can be used for 6DOF tracking. In some examples, the handheld controller 400B can include a camera, as described; and the headgear device 400A can include an optical target for optical tracking in conjunction with the camera. In some examples, the headgear device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the handheld controller 400B relative to the headgear device 400A may be determined. In some examples, 6DOF totem subsystem 404A can include an Inertial Measurement Unit (IMU) that is useful to provide improved accuracy and/or more timely information on rapid movements of the handheld controller 400B.

Figure 4B:
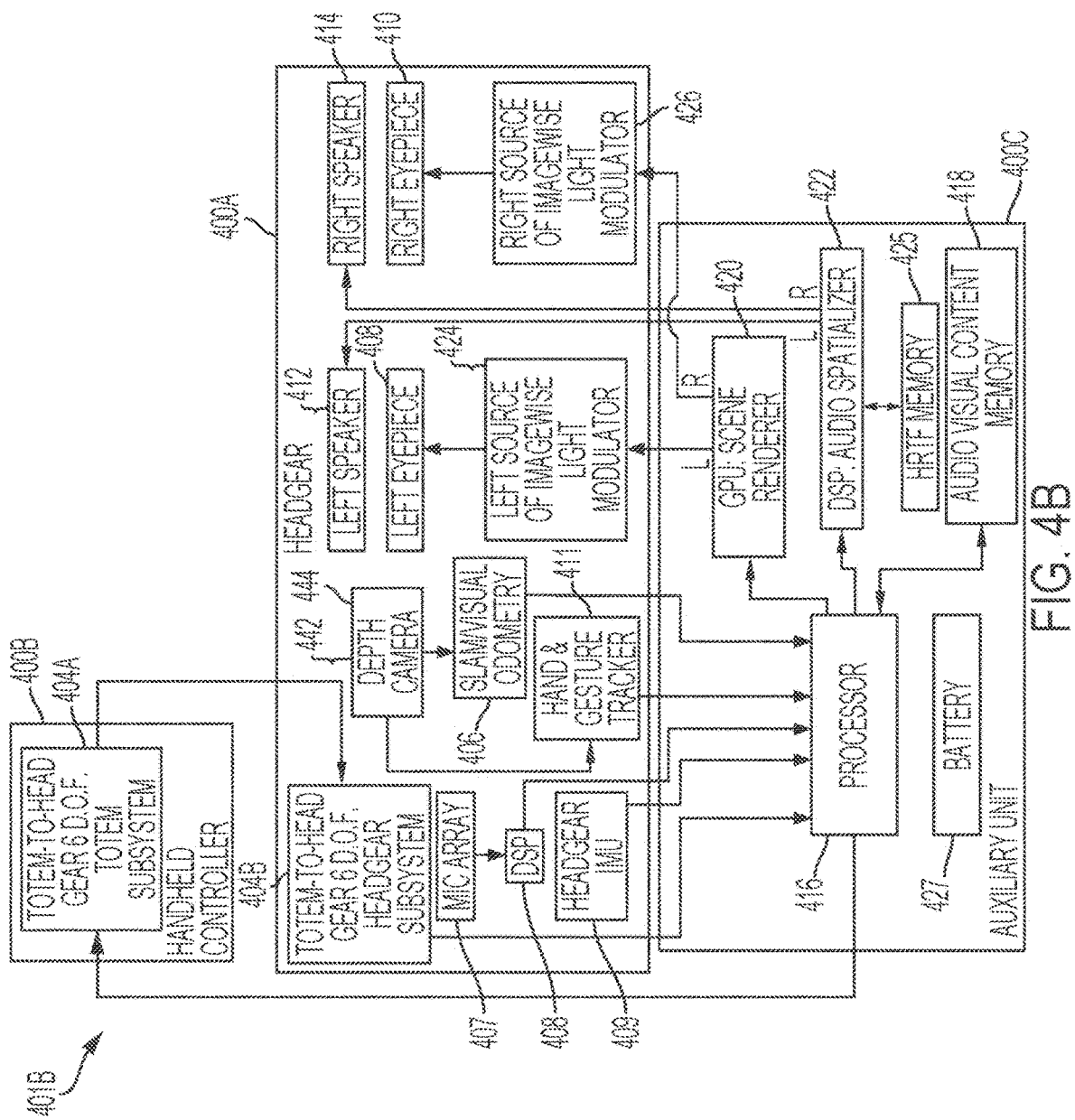

FIG. 4B shows an example functional block diagram that may correspond to an example wearable system 401B (which can correspond to example wearable system 401A). In some embodiments, wearable system 401B can include microphone array 407, which can include one or more microphones arranged on headgear device 400A. In some embodiments, microphone array 407 can include four microphones. Two microphones can be placed on a front face of headgear 400A, and two microphones can be placed at a rear of head headgear 400A (e.g., one at a back-left and one at a back-right), such as the configuration described with respect to FIG. 1B. The microphone array 407 can include any suitable number of microphones, and can include a single microphone. In some embodiments, signals received by microphone array 407 can be transmitted to DSP 408. DSP 408 can be configured to perform signal processing on the signals received from microphone array 407. For example, DSP 408 can be configured to perform noise reduction, acoustic echo cancellation, and/or beamforming on signals received from microphone array 407. DSP 408 can be configured to transmit signals to processor 416. In some embodiments, the DSP 408 and/or processor 416 are configured to execute instructions stored in memory of the wearable system to implement aspects of a voice user interface system (e.g., VUI system 500, VUI system 700) configured to receive a voice input or an audio signal from microphone array 407. In some embodiments, the system 401B can include multiple signal processing stages that may each be associated with one or more microphones. In some embodiments, the multiple signal processing stages are each associated with a microphone of a combination of two or more microphones used for beamforming. In some embodiments, the multiple signal processing stages are each associated with noise reduction or echo-cancellation algorithms used to pre-process a signal used for either voice onset detection, key phrase detection, or endpoint detection.

In some examples involving augmented reality or mixed reality applications, it may be desirable to transform coordinates from a local coordinate space (e.g., a coordinate space fixed relative to headgear device 400A) to an inertial coordinate space, or to an environmental coordinate space. For instance, such transformations may be necessary for a display of headgear device 400A to present a virtual object at an expected position and orientation relative to the real environment (e.g., a virtual person sitting in a real chair, facing forward, regardless of the position and orientation of headgear device 400A), rather than at a fixed position and orientation on the display (e.g., at the same position in the display of headgear device 400A). This can maintain an illusion that the virtual object exists in the real environment (and does not, for example, appear positioned unnaturally in the real environment as the headgear device 400A shifts and rotates). In some examples, a compensatory transformation between coordinate spaces can be determined by processing imagery from the depth cameras 444 (e.g., using a Simultaneous Localization and Mapping (SLAM) and/or visual odometry procedure) in order to determine the transformation of the headgear device 400A relative to an inertial or environmental coordinate system. In the example shown in FIG. 4, the depth cameras 444 can be coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and a real coordinate space. Similarly, in some examples, an additional source of information on the user's head pose and location is obtained from an IMU 409 of headgear device 400A. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of headgear device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from headgear subsystem 404B, the IMU 409, the SLAM/visual odometry block 406, depth cameras 444, microphones 450; and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 400B). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 300). The auxiliary unit 400C may include a battery 427 to power its components and/or to supply power to headgear device 400A and/or handheld controller 400B. Including such components in an auxiliary unit, which can be mounted to a user's waist, can limit or reduce the size and weight of headgear device 400A, which can in turn reduce fatigue of a user's head and neck.

While FIGS. 4A and 4B present elements corresponding to various components of an example wearable systems 401A and 401B, various other suitable arrangements of these components will become apparent to those skilled in the art. For example, the headgear device 400A illustrated in FIG. 4A or FIG. 4B may include a processor and/or a battery (not shown). The included processor and/or battery may operate together with or operate in place of the processor and/or battery of the auxiliary unit 400C. Generally, as another example, elements presented or functionalities described with respect to FIG. 4 as being associated with auxiliary unit 400C could instead be associated with headgear device 400A or handheld controller 400B. Furthermore, some wearable systems may forgo entirely a handheld controller 400B or auxiliary unit 400C. Such changes and modifications are to be understood as being included within the scope of the disclosed examples.

Figure 5:
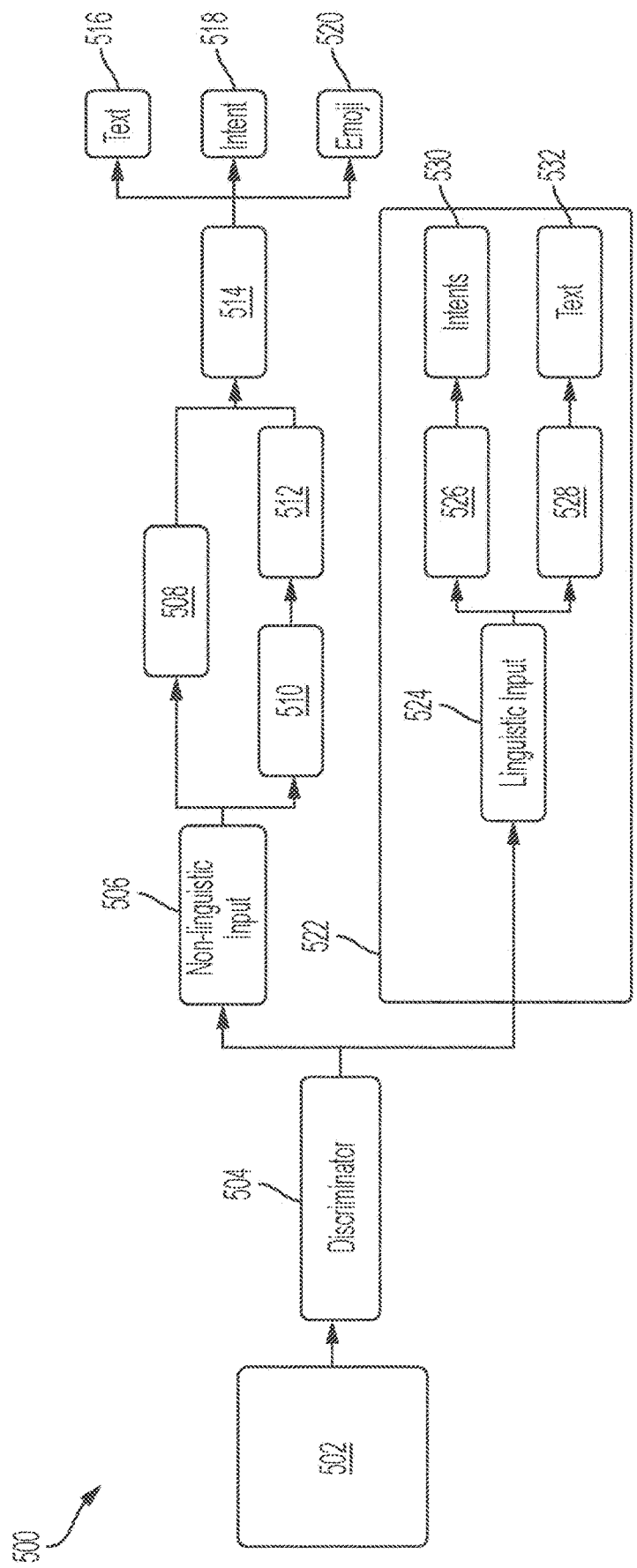
FIG. 5 illustrates an exemplary voice user interface system according to some embodiments of the disclosure.

FIG. 5 illustrates an exemplary voice user interface (VUI) system 500 according to some embodiments of the disclosure. The VUI system 500 may be implemented on a system such as wearable head device 100A, wearable head device 100B, wearable system 401A, wearable system 401B, and a mixed reality system. However, it is understood that the described wearable systems are merely exemplary, and that the VUI system may be implemented in other systems (e.g., a voice assistant running on a device connected to a power outlet or a voice assistant in a vehicle). Instructions associated with elements of the VUI system may be stored in memories of a system (e.g., wearable head device 100A, wearable head device 100B, wearable system 401A, wearable system 401B, a mixed reality system) comprising the VUI system and executed by a processor (e.g., CPU, GPU, DSP, ASIC) of the system. Elements of the VUI system may also be implemented over different devices (e.g., some analyses may be performed over the cloud or over a neural network).

In some embodiments, the VUI system 500 receives a voice input 502, which may be an audio signal (e.g., using a microphone disclosed herein), and causes a system (e.g., mixed reality system) to perform an action (e.g., actions 516, 518, 520, 530, 532) associated with the voice input. In some embodiments, the voice input may comprise a linguistic input or a non-linguistic input. As used herein, a linguistic input may be an input comprising a word of a language, and a non-linguistic input may be an input that does not substantially comprise a linguistic input (e.g., paralinguistic input, prosodic input, voice tones). In addition, the actions may be performed additionally based on a non-voice input (e.g., user movement, user facial expressions, user gestures) received by a sensor of the system as described herein.

In some embodiments, the VUI may verify whether an input is a valid voice input before further processing the voice input (e.g., verify whether the input is a voice input of a user of the VUI, verify whether the input is directed to the VUI, verify whether the input is associated with an action). For example, a plurality of microphones (e.g., microphones 150) may receive the audio input and determine a location of a source of the audio input based on levels and directions of the received signals at each of the microphones (e.g., as described with respect to FIGS. 1-4). In accordance with a determination that the source of the audio is associated with a user of the VUI, the voice input can be further processed, as disclosed herein.

In some embodiments, a first processor (e.g., a CPU, GPU, DSP, ASIC) may determine whether the audio comprises a valid voice input (e.g., verify whether the input is a voice input of a user of the VUI, verify whether the input is directed to the VUI, verify whether the input is associated with an action) and a non-linguistic input, using the systems and methods described herein, before a second processor (e.g., CPU, GPU, DSP, ASIC) further processes the voice input with features of the disclosed VUI.

Such capabilities may be advantageous in mobile applications of speech processing, such as virtual reality or augmented reality applications on a wearable device. In such wearable applications, the user may speak without directing input speech to the wearable system. The user may also be in locations where significant amounts of background speech exists. Further, the wearable system may be battery-operated and have a limited operation time. Sensors of wearable systems (such as those described herein with respect to FIGS. 1-4) may be advantageously utilized to solve the problems of speech processing inaccuracy (e.g., reduce false triggering of the VUI) and power consumption by verifying the validity of an audio input before further processing the input.

In some embodiments, the voice input 502 may comprise more than one linguistic or non-linguistic input and can be segmented based on the voice input's temporal or spectral characteristics (e.g., pauses, change in temporal patterns, change in spectral patterns). In some examples, each of the segmented portions in the voice input may be processed independently in the VUI to determine a corresponding action. In some examples, each of the segmented portions may be processed independently and the kind of input for each of the portions is determined. The determined inputs may collected determine a corresponding action.

In some embodiments, the VUI system 500 includes a voice input discriminator 504, a convolutional neural network (CNN) 508, non-linguistic feature computation engine 510, non-linguistic feature classifier 512, decision engine 514, natural language understanding (NLU) engine 526, and automatic speech recognition (ASR) engine 528. Although the exemplary VUI system 500 is described with the illustrated elements, it is understood that other configurations (e.g., less elements, additional components) of VUI system 500 exist without departing from the scope of the disclosure.

The voice input discriminator 504 may receive the voice input 502 (e.g., an audio signal associated with a voice input). It may determine whether the audio signal comprises a linguistic input 524 and/or a non-linguistic input 506. Features of the voice input discriminator 504 and determination of whether a voice input or an audio signal comprises a linguistic input 524 and/or a non-linguistic input 506 are described in more detail with respect to FIG. 6.

In some embodiments, in accordance with a determination that the voice input 502 comprises a non-linguistic input 506 (e.g., a paralinguistic input, prosodic input), the VUI system 500 receives information associated with the voice input 502 or audio signal comprising the non-linguistic input 506 from the CNN 508.

In some embodiments, in accordance with a determination that the voice input 502 comprises a non-linguistic input 506 (e.g., a paralinguistic input, prosodic input), the non-linguistic feature computation engine 510 extracts non-linguistic features from the voice input 502 or audio signal comprising the non-linguistic input 506. For example, the feature computation engine 510 may identify or extract time-domain and frequency-domain features of a non-linguistic input 506. One or more these features may be used to uniquely identify a kind of non-linguistic input 506.

After the non-linguistic features had been extracted from the voice input 502 or audio signal, the extract features may be classified with the non-linguistic feature classifier 512. From the one or a combination of these features, the non-linguistic feature classifier 512 may uniquely identify and classify the kind of non-linguistic input.

In some embodiments, the decision engine 514 may receive the information from the CNN 508 and/or classification of features associated with the voice input 502 or audio signal comprising the non-linguistic input 506 from the non-linguistic feature classifier 512. Based on the information from the CNN 508 and/or the feature classifications, an action associated with the voice input 502 may be determined. In response, the system (e.g., wearable head device 100A, wearable head device 100B, wearable system 401A, wearable system 401B, a mixed reality system) comprising the VUI system 500 may be caused to perform the determined action.

For example, the determined non-linguistic input may be matched with a pre-configured action. In some embodiments, the pre-configured action may be mapped to a non-linguistic input by training the system. In some embodiments, the pre-configured action may be mapped by a designer of the VUI system to improve user accessibility to operations of the device implementing the VUI system. These actions are described in more detail herein.

In some embodiments, the action comprises one of texting 516, performing an intent 518, or inserting an emoji 520. For example, a vocal click may instruct the VUI to cause a device to take a picture (e.g., performing an intent 518). As another example, two vocal clicks may instruct the VUI to cause a device to take a video (e.g., performing an intent 518). As yet another example, while browsing a social media application, a user's "kiss" sound may cause a device to "like" a post and insert a smile or heart emoji (e.g., performing an intent 518 and inserting an emoji 520). As yet another example, a laugh or a chuckle may cause a device to insert a smile or laughing emoji into a message (e.g., inserting an emoji 520).

In some embodiments, the action texting 516, performing an intent 518, or inserting an emoji 520 may be alternatively or additionally based on non-voice inputs. In some embodiments, a sensor of a device (e.g., a camera, any sensor disclosed herein) senses a facial expression of a user of the device to cause the device to perform the action. For example, a camera of the device may sense the user smiling and in accordance with a determination that the user is smiling, the device is caused to perform an associated action (e.g., insert a smiling emoji, take a selfie). As another example, a camera of the device may sense that the user is grimacing and in accordance with a determination that the user is grimacing, the device is caused to perform an associated action (e.g., insert a disgusted emoji, ask the user if medical assistance is needed). In some embodiments, a sensor of a device (e.g., a camera, an IMU, an accelerometer, any sensor disclosed herein) senses a gesture or movement of a user of the device to cause the device to perform the action. For example, a sensor of the device may sense that the user is waving and in accordance with a determination that the user is waving, the device is caused to perform an associated action (e.g., insert a waving emoji, send a greeting message). As another example, a sensor of the device may sense that the user is nodding his or her head and in accordance with a determination that the user is nodding, the device is caused to perform an associated action (e.g., replying yes in a message, inputting a confirmation).

As an exemplary advantage, associating these non-linguistic inputs with an action results in a VUI that is able to respond to time-critical commands much closer to real-time than is possible with natural-language processing (NLP) systems. For example, the disclosed VUI may be advantageously used in healthcare applications, where execution of voice commands in a prompt manner may be critical (e.g., during a surgery, when a surgeon's hands are occupied and a handless and time-critical are needed).

In some embodiments, a VUI may be trained to recognize a user's unique non-linguistic utterances (e.g., vocal clicks, pops, kisses). These utterances may then be used as combined WuWs and actions (e.g., actions 516, 518, 520, 716, 718, 720). In some embodiments, a user may map a recognized utterance to an action (e.g., mapping one click to taking a picture, mapping two clicks to recording a video). In some embodiments, more than one user may have different mappings between utterances and corresponding actions. For example, a first user may map one click to taking a picture, while a second user may map one click to recording a video. As another example, a first user may map a kissing sound to sending a heart emoji, while a second user may map a kissing sound to sending "I love you" to the user's mother.

In some embodiments, a position of the device may be determined and the actions associated with the non-linguistic input are associated with the position of the system. For example, actions associated with the non-linguistic inputs may be culture specific, including based on the location (e.g., country) of the device.

Although actions associated with the non-linguistic input 506 are described using actions 516, 518, and 520, it is understood that these actions are merely exemplary and other actions associated with the non-linguistic input 506 exist without departing from the scope of the disclosure.

In some embodiments, in accordance with a determination that the voice input 502 comprises a linguistic input 524, the NLU engine 526 receives the voice input 502 or audio signal comprising the linguistic input 524. The NLU engine 526 may determine an action associated with the voice input 502 or audio signal comprising the linguistic input 524. The action may be intent 530. In some embodiments, the NLU engine 526 is configured to receive the linguistic input 524 after a WuW is inputted.

For example, a user may provide a voice input by saying "take a picture." The voice user voice input discriminator 504 may determine that the voice input is a linguistic input. The NLU engine 526 receives the voice input and determine that the voice input comprises the words "take a picture." Based on the words determined by the NLU engine, the VUI system determines that the words are associated with taking a picture with a camera. Based on this determination, the system (e.g., wearable head device 100A, wearable head device 100B, wearable system 401A, wearable system 401B, a mixed reality system) comprising the VUI would be caused to take a picture with the camera of the system.

As illustrated in the examples, by processing non-linguistic information (e.g., tone, prosody, speech cadence, emotion) in a voice input, the disclosed voice user interface system may advantageously allow for quicker response and action on a device for time-critical actions.

In some embodiments, in accordance with a determination that the voice input 502 comprises a linguistic input 524, the ASR engine 528 receives the voice input 502 or audio signal comprising the linguistic input 524. The ASR engine 528 may determine an action associated with the voice input 502 or audio signal comprising the linguistic input 524. The action may be text 532. In some embodiments, the ASR engine 528 is configured to receive the linguistic input 524 after a WuW and/or a messaging command are inputted.

For example, a user may provide a voice input by saying "hi, I am on my way." The voice user voice input discriminator 504 may determine that the voice input is a linguistic input. The ASR engine 528 receives the voice input and determine that the voice input comprises the words "hi, I am on my way." Based on the words determined by the ASR engine, the VUI system determines that the words are associated with a message intended to be transmitted to a recipient. Based on this determination, the system (e.g., wearable head device 100A, wearable head device 100B, wearable system 401A, wearable system 401B, a mixed reality system) comprising the VUI would be caused to send the message "hi, I am on my way" to a desired recipient.

Although actions associated with the non-linguistic input 524 are described using actions 530 and 532, it is understood that these actions are merely exemplary and other actions associated with the non-linguistic input 524 exist without departing from the scope of the disclosure.

Figure 6:
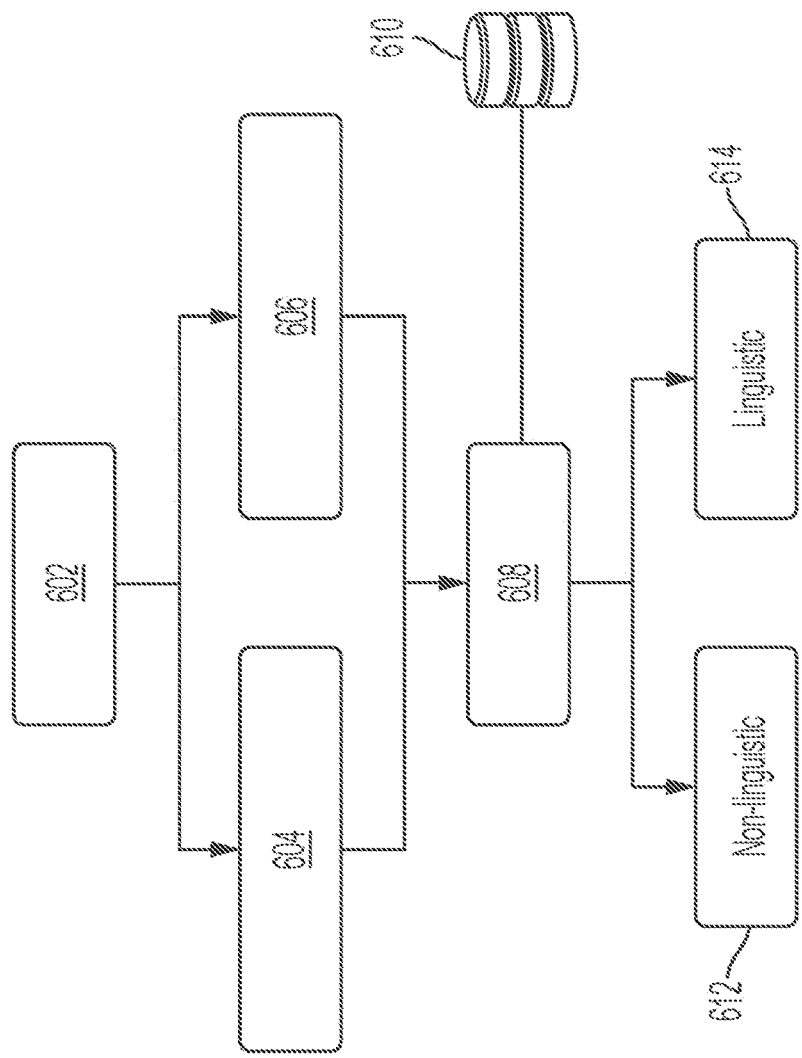
FIG. 6 illustrates an exemplary voice input discriminator according to some embodiments of the disclosure.

FIG. 6 illustrates an exemplary voice input discriminator 600 according to some embodiments of the disclosure. In some embodiments, the voice input discriminator 600 is voice input discriminator 504 or voice input discriminator 704. In some embodiments, the voice input discriminator 600 includes frequency-domain feature identifier 604, time-domain feature identifier 606, and voice input classifier 608. The frequency-domain feature identifier 604 may quantify frequency-domain characteristics of the voice input 602 (e.g., voice input 502, voice input 702) (e.g., perform a spectral analysis on the voice input, determine fundamental frequency of the voice input). The time-domain feature identifier 606 may quantify time-domain characteristics of the voice input 602 (e.g., voice input 502, voice input 702) (e.g., measure amplitude of the voice input over time).

The identified frequency and time-domain features of the voice input 602 may be send to the voice input classifier 608. The voice input classifier 608 may communicate with a feature database 610. The feature database 610 may include information (frequency-domain and time-domain features) associated with linguistic and non-linguistic (e.g., paralinguistic) inputs and the voice input classifier 608 may receive the information and, based on the received information, determine whether a voice input (e.g., voice input 502, voice input 702) comprises a linguistic input or a non-linguistic input.

A non-linguistic input may include frequency-domain characteristics such as distinct frequency component and unchanging spectral content, which may be identified using the frequency-domain feature identifier 604. For example, some non-linguistic input may include a high frequency component not typically found in linguistic inputs. As another example, non-linguistic inputs such as a grunt, a shrug, or an ugh may include low frequency component not typically found in linguistic inputs. Additionally, the frequency-domain feature identifier 604 may identify linguistic spectral characteristics such as formants in a voice input. A non-linguistic input (e.g., a click, a kissing sound) may include transient or less dynamic (e.g., less change over time, compared to a linguistic input) time-domain characteristics, which may be identified using the time-domain feature identifier 606. The time-domain feature identifier 606 may also identify linguistic temporal characteristics such as rhythm and rate in a voice input.

Based on the identified time-domain and frequency-domain features using the frequency-domain feature identifier 604 and time-domain feature identifier 606, the feature database 610 may transmit information related to the identified features to the voice input classifier 608. The voice input classifier 608 may determine whether the voice input 602 comprises a linguistic input and/or a non-linguistic input and transmit based on the information received from the feature database 610.

In some embodiments, the feature database 610 may be part of a neural network. In some embodiments, the feature database 610 may be a database external to a device implementing the VUI system (e.g., cloud). In some embodiments, the feature database 610 may be stored in a device (e.g., wearable head device 100A, wearable head device 100B, wearable system 401A, wearable system 401B) comprising the VUI.

Figure 7:
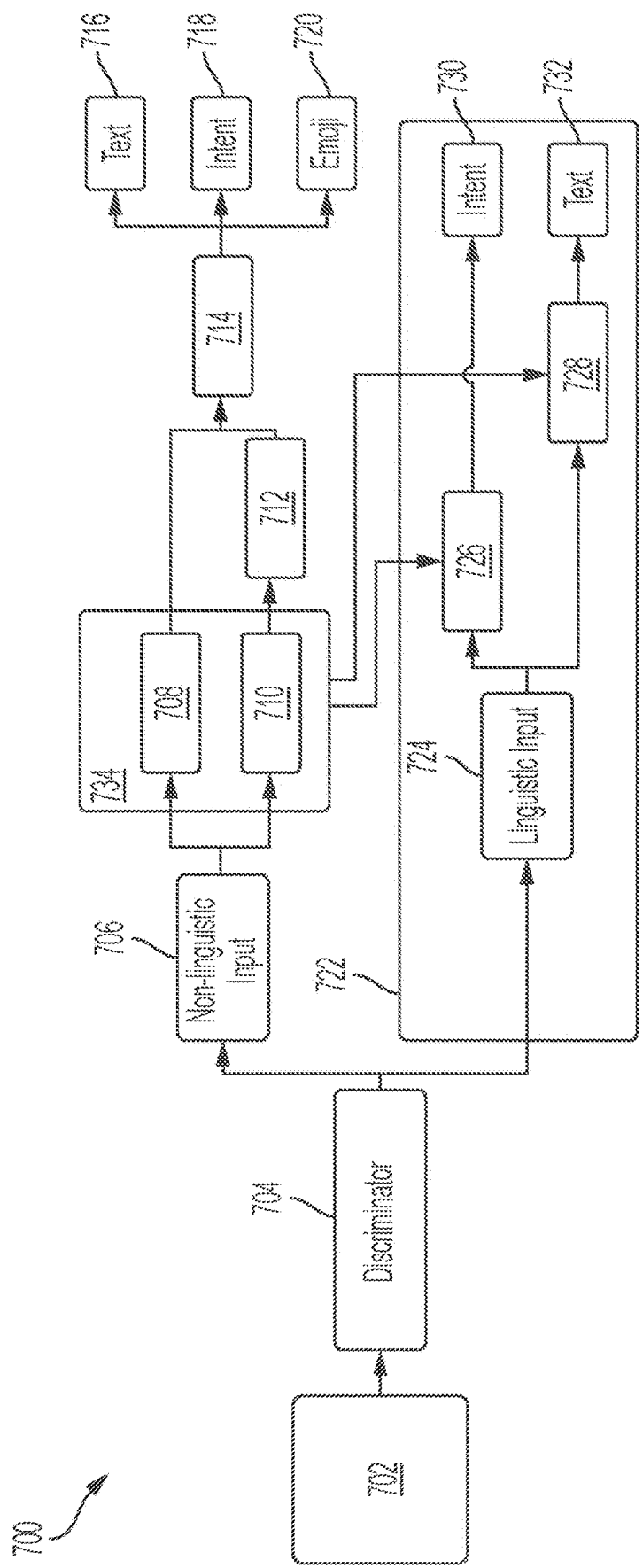
FIG. 7 illustrates an exemplary voice user interface system according to some embodiments of the disclosure.

FIG. 7 illustrates an exemplary VUI system 700 according to some embodiments of the disclosure. The VUI system 700 may be implemented on a system such as wearable head device 100A, wearable head device 100B, wearable system 401A, and wearable system 401B. However, it is understood that the described wearable systems are merely exemplary, and that the VUI system may be implemented in other systems. Instructions associated with elements of the VUI system may be stored in memories of a system (e.g., wearable head device 100A, wearable head device 100B, wearable system 401A, wearable system 401B) comprising the VUI system and executed by a processor (e.g., CPU, GPU, DSP, ASIC) of the system. Elements of the VUI system may also be implemented over different devices (e.g., some analyses may be performed over the cloud).

In some embodiments, the VUI system 700 receives a voice input 702 (e.g., using a microphone disclosed herein) and causes a system (e.g., mixed reality system) to perform an action (e.g., actions 716, 718, 720, 730, 732) associated with the voice input. In some embodiments, the voice input may comprise a linguistic input or a non-linguistic input.

In some embodiments, the VUI system 700 includes a voice input discriminator 704, a convolutional neural network (CNN) 708, non-linguistic feature computation engine 710, non-linguistic feature classifier 712, decision engine 714, natural language understanding (NLU) engine 726, and automatic speech recognition (ASR) engine 728. Although the exemplary VUI system 700 is described with the illustrated elements, it is understood that other configurations (e.g., less elements, additional components) of VUI system 500 exist without departing from the scope of the disclosure.

In some embodiments, some of the elements in VUI system 700 may be substantially similar to elements in VUI system 500. For example, the voice input discriminator 704 may be substantially similar to the voice input discriminator 504, the CNN 708 may be substantially similar to CNN 508, the non-linguistic feature computation engine 710 may be substantially similar to non-linguistic feature computation engine 510, non-linguistic feature classifier 712 may be substantially similar to non-linguistic feature classifier 512, decision engine 714 may be substantially similar to decision engine 514, NLU engine 726 may be substantially similar to NLU engine 526, and ASR engine 728 may be substantially similar to ASR engine 528, the actions 716, 718, and 720 may be substantially similar to actions 516, 518, and 520.

In some embodiments, as illustrated, CNN 708 and feature engine computation 710 form non-linguistic analysis unit 734. The non-linguistic analysis unit 734 may provide information to NLU engine 726 and ASR engine 728. The provided information may yield more accurate results associated with intent action 730 or text action 732 associated with a linguistic input of the voice input 702. For example, the non-linguistic analysis unit 734 may provide more information about a voice input comprising linguistic input beyond merely the words of the voice input, such as conveying emotion and intent.

In some embodiments, the voice input 702 may comprise linguistic and non-linguistic input that may affect an associated action (e.g., actions 730, 732). For example, a user may provide a voice input by saying "how are you?". The voice user voice input discriminator 704 may determine that the voice input comprises a linguistic input and a non-linguistic input. The ASR engine 728 receives the voice input and determine that the voice input comprises the words "how are you." The non-linguistic analysis unit 734 may determine that the voice input comprises a non-linguistic input of a raised tone near the end of the voice input. Based on the words determined by the ASR engine and the determination of a raised tone in the voice input, the VUI system determines that the words are associated with a message intended to be transmitted to a recipient in the form of a question. Based on these determinations, the system (e.g., wearable head device 100A, wearable head device 100B, wearable system 401A, wearable system 401B, a mixed reality system) comprising the VUI would be caused to send the message "how are you?" to a desired recipient.

The non-linguistic analysis unit 734 may determine that the voice input comprises a non-linguistic input comprising inflection and prosody. These non-linguistic input may emphasize more important portions of the voice input, and the associated action may be performed based on these non-linguistic input (e.g., emphasis made be added to the more important portions of a message, an action may be performed with a higher priority).

For example, a user may provide a voice input by saying "WHEN is Mom's birthday?". The voice user voice input discriminator 704 may determine that the voice input comprises a linguistic input and a non-linguistic input. The ASR engine 728 receives the voice input and determine that the voice input comprises the words "when is Mom's birthday." The non-linguistic analysis unit 734 may determine that the voice input comprises a non-linguistic input comprising an emphasis on the word "when." Based on the words determined by the ASR engine and the determination of a raised tone and the emphasis in the voice input, the VUI system determines that the words are associated with a message intended to be transmitted to a recipient in the form of a question and the word "when" is emphasized. Based on these determinations, the system (e.g., wearable head device 100A, wearable head device 100B, wearable system 401A, wearable system 401B, a mixed reality system) comprising the VUI would be caused to send the message "WHEN is Mom's birthday?" to a desired recipient. Alternatively, based on these determinations, in the message, the word "when" may be formatted (e.g., boldface, italics, underline, underline, strikethrough, diacritical marks, punctuation formatting, font is enlarged, a different font is used) to indicate emphasis on the word.

As another example, a user may provide a voice input by saying "Ha. Ha." in a sarcastic manner. The voice user voice input discriminator 704 may determine that the voice input comprises a linguistic input and a non-linguistic input. The ASR engine 728 receives the voice input and determine that the voice input comprises the words "Haha." The non-linguistic analysis unit 734 may determine that the voice input comprises a non-linguistic input comprising a sarcastic tone (e.g., by comparing time-domain and frequency-domain features of the input with features of typical usage of the input words). Based on the words determined by the ASR engine and the determination of a sarcastic tone in the voice input, the VUI system determines that the words are associated with a message intended to be transmitted to a recipient to convey sarcasm. Based on these determinations, the system (e.g., wearable head device 100A, wearable head device 100B, wearable system 401A, wearable system 401B, a mixed reality system) comprising the VUI would be caused to send the message "Ha. Ha." to a desired recipient. Alternatively, the system may be caused to send the message along with a smiley or winking emoji or an indicator (e.g., "Is," "/sarcasm" to convey sarcasm in the message.

As yet another example, a user may provide a voice input by saying "TAKE A PICTURE" in a louder voice. The voice user voice input discriminator 704 may determine that the voice input comprises a linguistic input and a non-linguistic input. The NLU engine 726 receives the voice input and determine that the voice input comprises the words "take a picture," causing a device comprising the VUI to take a picture. The non-linguistic analysis unit 734 may determine that the voice input comprises a non-linguistic input comprising an emphasis on the entire input. Based on the words determined by the NLU engine and the determination of the emphasis in the voice input, the VUI system determines that it should cause a picture to be taken, but the picture taking operation should be modified. For example, the emphasis of the input may convey urgency for taking the picture. Based on these determinations, the system (e.g., wearable head device 100A, wearable head device 100B, wearable system 401A, wearable system 401B, a mixed reality system) comprising the VUI would be caused the picture to be taken in a modified manner (e.g., the picture may be taken more quickly, a confirmation prompt may be bypassed to take the picture in a quicker manner, a default setting may be used to take the picture without prompting the user, system resources may be freed up to prioritize the picture taking task).

As illustrated in the examples, by processing non-linguistic information (e.g., tone, prosody, speech cadence, emotion) in a voice input, the disclosed voice user interface system may advantageously convey subtleties of a user's underlying emotion and/or intent by supplementing a user's text with appropriate emojis, formatting a user's text to assist in conveyance of the user's emotion and tone, and/or altering the user's supplied text.

Although actions associated with the non-linguistic input 706 are described using actions 716, 718, and 720, it is understood that these actions are merely exemplary and other actions associated with the non-linguistic input 706 exist without departing from the scope of the disclosure.

Although actions associated with the non-linguistic input 724 are described using actions 730 and 732, it is understood that these actions are merely exemplary and other actions associated with the non-linguistic input 724 exist without departing from the scope of the disclosure.

Figure 8:
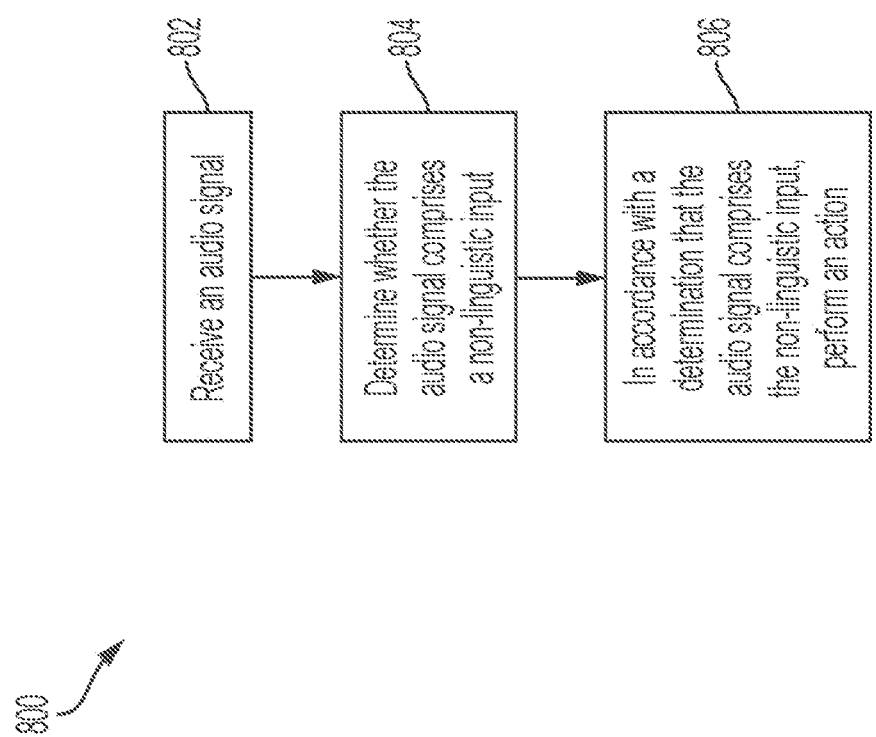
FIG. 8 illustrates an exemplary method of operating a voice user interface system according to some embodiments of the disclosure.

FIG. 8 illustrates an exemplary method 800 of operating a VUI system according to some embodiments of the disclosure. Although the method 800 is illustrated as including the described steps, it is understood that different order of step, additional step, or less step may be included without departing from the scope of the disclosure. In some embodiments, the method 800 is performed with at least one of VUI system 500 and VUI system 700. For the sake of brevity, some elements and advantages associated with these systems are not repeated here.

In some embodiments, the method 800 includes receiving, using a microphone of a system, an audio signal (step 802). For example, as described with respect to FIG. 5, the VUI system 500 receives a voice input 502 using microphone of the system. As another example, as described with respect to FIG. 7, the VUI system 700 receives a voice input 702 using microphone of the system.

In some embodiments, the method 800 includes determining whether the audio signal comprises a non-linguistic input (step 804). For example, as described with respect to FIG. 5, the voice input discriminator 504 receives the voice input 502 and determine whether the voice input comprises a linguistic input 524 and/or a non-linguistic input 506. As another example, as described with respect to FIG. 7, the voice input discriminator 704 receives the voice input 702 and determine whether the voice input comprises a linguistic input 724 and/or a non-linguistic input 706.

In some embodiments, the method 800 includes in accordance with a determination that the audio signal comprises the non-linguistic input, performing an action associated with the non-linguistic input (step 806). For example, as described with respect to FIG. 5, the VUI system 500 causes an action (e.g., actions 516, 518, 520) associated with a non-linguistic input 506 to be performed. As another example, as described with respect to FIG. 7, the VUI system 700 causes an action (e.g., actions 716, 718, 720) associated with a non-linguistic input 706 to be performed.

In some embodiments, the action comprises one of texting, performing an intent, and inserting an emoji. For example, as described with respect to FIG. 5, the action comprises one of texting 516, performing an intent 518, and inserting an emoji 520. As another example, as described with respect to FIG. 7, the action comprises one of texting 716, performing intent 718, and inserting an emoji 720.

In some embodiments, the system is a mixed reality system in a mixed reality environment, and the action is further associated with the mixed reality environment. For example, the mixed reality system (e.g., wearable head device 100A, wearable head device 100B, wearable system 401A, wearable system 401B) includes the VUI system 500 and/or the VUI system 700 and is in a mixed reality environment. The action that the VUI system 500 and/or the VUI system 700 causes to perform is an action associated with the mixed reality environment.

In some embodiments, the non-linguistic input is a paralinguistic input, and in accordance with a determination that the audio signal comprises the paralinguistic input, the action comprises a first action associated with the paralinguistic input. For example, the In some embodiments, the non-linguistic input is a prosodic input, and in accordance with a determination that the audio signal comprises the prosodic input, the action comprises a second action associated with the prosodic input. For example, as described with respect to FIG. 5, the voice input discriminator 504 determines that the voice input includes a prosodic input, and the VUI system 500 causes an action associated with the prosodic input, as described herein, to be performed. As another example, as described with respect to FIG. 7, the voice input discriminator 704 determines that the voice input includes a prosodic input, and the VUI system 700 causes an action associated with the prosodic input, as described herein, to be performed.

In some embodiments, the second action is a modification of an action associated with a linguistic input. For example, as described with respect to FIG. 7, the voice input discriminator 704 determines that the voice input includes a prosodic input, and the VUI system 700 causes an action associated with a linguistic input to be modified, as described herein.

In some embodiments, the prosodic input is indicative of an emotion associated with a user of the system, the user of the system associated with the audio signal, and the action is further associated with the emotion. For example, as described with respect to FIGS. 5 and 7, a voice input is determined to include a prosodic input, and the prosodic input is indicative of an emotion of a user who provided an input to the VUI system 500 or VUI system 700. The action associated with prosodic input is further associated with the emotion of the user, as described herein.

In some embodiments, the method 800 includes determining whether the audio signal comprises a linguistic input; and in accordance with a determination that the audio signal comprises the linguistic input, performing a third action associated with the linguistic input. For example, as described with respect to FIG. 5, the voice input discriminator 504 determines the voice input comprises a linguistic input 524, and the VUI system 500 causes an action (e.g., actions 530, 532) associated with a linguistic input 524 to be performed. As another example, as described with respect to FIG. 7, the voice input discriminator 704 determines the voice input comprises a linguistic input 724, and the VUI system 700 causes an action (e.g., actions 730, 732) associated with a linguistic input 724 to be performed.

In some embodiments, the action comprises a modification of the third action based on the non-linguistic input. For example, as described with respect to FIG. 7, the action (e.g., actions 730, 732) associated with a linguistic input 724 is modified, as described herein, based on the non-linguistic input 706.

In some embodiments, the method 800 includes in accordance with a determination that the audio signal comprises the non-linguistic input, receiving information associated with the audio signal from a convolutional neural network, wherein the action is performed based on the information. For example, as described with respect to FIG. 5, the voice input discriminator 504 determines that the voice input includes a non-linguistic input, and the convolutional neural network 508 receives information associated with the voice input for processing, as described herein. For example, as described with respect to FIG. 7, the voice input discriminator 704 determines that the voice input includes a non-linguistic input, and the convolutional neural network 708 receives information associated with the voice input for processing, as described herein.

In some embodiments, the method 800 includes classifying a feature of the non-linguistic input. The action is performed based on the classified feature. For example, as described with respect to FIG. 5, non-linguistic feature classifier 512 identifies and classifies a kind of non-linguistic input corresponding to the non-linguistic input, and the VUI system 500 causes an action to be performed based on the kind of non-linguistic input. As another example, as described with respect to FIG. 7, non-linguistic feature classifier 712 identifies and classifies a kind of non-linguistic input corresponding to the non-linguistic input, and the VUI system 700 causes an action to be performed based on the kind of non-linguistic input.

In some embodiments, the method 800 includes receiving, from a sensor of the system different from the microphone, information associated with an environment of the system, wherein the action is further associated with the information received from the sensor. For example, as described with respect to FIG. 5 or FIG. 7, a sensor of a device including the VUI system 500 or the VUI system 700 receives an input including information associated with an environment of the system, and the VUI system 500 or the VUI system 700 causes the device to perform an action associated with the information associated with the environment of the system.

In some embodiments, the method 800 includes determining a position of the system, wherein the action is further associated with the position of the system. For example, as described with respect to FIGS. 5 and 7, actions associated with the non-linguistic inputs may be culture specific, based on the location (e.g., country) of the device.

In some embodiments, in accordance with a determination that the system is associated with a first user, the action comprises a first action associated with the first user; and in accordance with a determination that the system is associated with a second user, different from the first user, the action comprises a second action associated with the second user, different from the first action. For example, as described with respect to FIGS. 5 and 7, a first user may map one click to taking a picture, while a second user may map one click to recording a video. As another example, a first user may map a kissing sound to sending a heart emoji, while a second user may map a kissing sound to sending "I love you" to the user's mother.

In some embodiments, the audio signal comprises a frequency-domain feature and a time-domain feature, and the determination of whether the audio comprises the non-linguistic input is based on the frequency-domain feature and the time-domain feature. For example, as described with respect to FIGS. 5 and 6, the voice input discriminator 502 or the voice input discriminator 602 identifies frequency-domain and time-domain features in the voice input, and the voice input discriminator 502 or the voice input discriminator 602 determines whether the voice input includes a non-linguistic input based on the identification of the frequency-domain and time-domain features.

In some embodiments, the method 800 includes receiving information from a feature database, wherein the determination of whether the audio comprises the non-linguistic input is further based on the information. For example, as described with respect to FIG. 6, the VUI system receives information related to identified features from a feature database 610, and the voice input discriminator 600 determines whether the voice input includes a non-linguistic input based on the information from the feature database 610.

In some embodiments, determining whether the audio signal comprises the non-linguistic input comprises using a first processor, and the method further comprises in accordance with a determination that the audio signal comprises the non-linguistic input, waking up a second processor to perform the action. For example, a first processor (e.g., a CPU, GPU, DSP, ASIC) may determine whether the audio comprises a voice input (e.g., verify whether the input is a voice input of a user of the VUI, verify whether the input is directed to the VUI, verify whether the input is associated with an action) and a non-linguistic input, using the systems and methods described herein, before a second processor (e.g., CPU, GPU, DSP, ASIC) further processes the voice input with features of the disclosed VUI.

According to some embodiments, a method comprises: receiving, using a microphone of a system, an audio signal; determining whether the audio signal comprises a non-linguistic input; and in accordance with a determination that the audio signal comprises the non-linguistic input, performing an action associated with the non-linguistic input.

According to some embodiments, the non-linguistic input is a paralinguistic input, and in accordance with a determination that the audio signal comprises the paralinguistic input, the action comprises a first action associated with the paralinguistic input.

According to some embodiments, the non-linguistic input is a prosodic input, and in accordance with a determination that the audio signal comprises the prosodic input, the action comprises a second action associated with the prosodic input.

According to some embodiments, the second action is a modification of an action associated with a linguistic input.

According to some embodiments, the prosodic input is indicative of an emotion associated with a user of the system, the user of the system associated with the audio signal, and the action is further associated with the emotion.

According to some embodiments, the method further comprises: determining whether the audio signal comprises a linguistic input; and in accordance with a determination that the audio signal comprises the linguistic input, performing a third action associated with the linguistic input.

According to some embodiments, the action comprises a modification of the third action based on the non-linguistic input.

According to some embodiments, the method further comprises in accordance with a determination that the audio signal comprises the non-linguistic input, receiving information associated with the audio signal from a convolutional neural network, wherein the action is performed based on the information.

According to some embodiments, the method further comprises classifying a feature of the non-linguistic input, wherein the action is performed based on the classified feature.

According to some embodiments, the method further comprises associating the action with the non-linguistic input.

According to some embodiments, the action comprises one of texting, performing an intent, and inserting an emoji.

According to some embodiments, the method further comprises receiving, from a sensor of the system different from the microphone, information associated with an environment of the system, wherein the action is further associated with the information received from the sensor.

According to some embodiments, the system is a mixed reality system in a mixed reality environment, and the action is further associated with the mixed reality environment.

According to some embodiments, the method further comprises determining a position of the system, wherein the action is further associated with the position of the system.

According to some embodiments, in accordance with a determination that the system is associated with a first user, the action comprises a first action associated with the first user; and in accordance with a determination that the system is associated with a second user, different from the first user, the action comprises a second action associated with the second user, different from the first action.

According to some embodiments, the audio signal comprises a frequency-domain feature and a time-domain feature, and the determination of whether the audio comprises the non-linguistic input is based on the frequency-domain feature and the time-domain feature.

According to some embodiments, the method further comprises receiving information from a feature database, wherein the determination of whether the audio comprises the non-linguistic input is further based on the information.

According to some embodiments, determining whether the audio signal comprises the non-linguistic input comprises using a first processor, and the method further comprises in accordance with a determination that the audio signal comprises the non-linguistic input, waking up a second processor to perform the action.

According to some embodiments, a system comprises: a microphone; and one or more processors configured to execute a method comprising: receiving, using the microphone, an audio signal; determining whether the audio signal comprises a non-linguistic input; and in accordance with a determination that the audio signal comprises the non-linguistic input, performing an action associated with the non-linguistic input.

According to some embodiments, the non-linguistic input is a paralinguistic input, and in accordance with a determination that the audio signal comprises the paralinguistic input, the action comprises a first action associated with the paralinguistic input.

According to some embodiments, the non-linguistic input is a prosodic input, and in accordance with a determination that the audio signal comprises the prosodic input, the action comprises a second action associated with the prosodic input.

According to some embodiments, the second action is a modification of an action associated with a linguistic input.

According to some embodiments, the prosodic input is indicative of an emotion associated with a user of the system, the user of the system associated with the audio signal, and the action is further associated with the emotion.

According to some embodiments, the method further comprises: determining whether the audio signal comprises a linguistic input; and in accordance with a determination that the audio signal comprises the linguistic input, performing a third action associated with the linguistic input.

According to some embodiments, the action comprises a modification of the third action based on the non-linguistic input.

According to some embodiments, the method further comprises in accordance with a determination that the audio signal comprises the non-linguistic input, receiving information associated with the audio signal from a convolutional neural network, wherein the action is performed based on the information.

According to some embodiments, the method further comprises classifying a feature of the non-linguistic input, wherein the action is performed based on the classified feature.

According to some embodiments, the method further comprises associating the action with the non-linguistic input.

According to some embodiments, the action comprises one of texting, performing an intent, and inserting an emoji.

According to some embodiments, the system further comprises a sensor different from the microphone, wherein the method further comprises receiving, from the sensor, information associated with an environment of the system, wherein the action is further associated with the information received from the sensor.

According to some embodiments, the system is a mixed reality system in a mixed reality environment, and the action is further associated with the mixed reality environment.

According to some embodiments, the method further comprises determining a position of the system, wherein the action is further associated with the position of the system.

According to some embodiments, in accordance with a determination that the system is associated with a first user, the action comprises a first action associated with the first user; and in accordance with a determination that the system is associated with a second user, different from the first user, the action comprises a second action associated with the second user, different from the first action.

According to some embodiments, the audio signal comprises a frequency-domain feature and a time-domain feature, and the determination of whether the audio comprises the non-linguistic input is based on the frequency-domain feature and the time-domain feature.

According to some embodiments, the method further comprises receiving information from a feature database, wherein the determination of whether the audio comprises the non-linguistic input is further based on the information.

According to some embodiments, determining whether the audio signal comprises the non-linguistic input comprises using a first processor, and the method further comprises in accordance with a determination that the audio signal comprises the non-linguistic input, waking up a second processor to perform the action.

According to some embodiments, a non-transitory computer-readable medium storing instructions that, when executed by one or more processors, cause the one or more processors to execute a method comprising: receiving, using a microphone of a system, an audio signal; determining whether the audio signal comprises a non-linguistic input; and in accordance with a determination that the audio signal comprises the non-linguistic input, performing an action associated with the non-linguistic input.

According to some embodiments, the non-linguistic input is a paralinguistic input, and in accordance with a determination that the audio signal comprises the paralinguistic input, the action comprises a first action associated with the paralinguistic input.

According to some embodiments, the non-linguistic input is a paralinguistic input, and in accordance with a determination that the audio signal comprises the paralinguistic input, the action comprises a first action associated with the paralinguistic input.

According to some embodiments, the non-linguistic input is a prosodic input, and in accordance with a determination that the audio signal comprises the prosodic input, the action comprises a second action associated with the prosodic input.

According to some embodiments, the second action is a modification of an action associated with a linguistic input.

According to some embodiments, the prosodic input is indicative of an emotion associated with a user of the system, the user of the system associated with the audio signal, and the action is further associated with the emotion.

According to some embodiments, the method further comprises: determining whether the audio signal comprises a linguistic input; and in accordance with a determination that the audio signal comprises the linguistic input, performing a third action associated with the linguistic input.

According to some embodiments, the action comprises a modification of the third action based on the non-linguistic input.

According to some embodiments, the method further comprises in accordance with a determination that the audio signal comprises the non-linguistic input, receiving information associated with the audio signal from a convolutional neural network, wherein the action is performed based on the information.

According to some embodiments, the method further comprises classifying a feature of the non-linguistic input, wherein the action is performed based on the classified feature.

According to some embodiments, the method further comprises associating the action with the non-linguistic input.

According to some embodiments, the action comprises one of texting, performing an intent, and inserting an emoji.

According to some embodiments, the method further comprises receiving, from a sensor of the system different from the microphone, information associated with an environment of the system, wherein the action is further associated with the information received from the sensor.

According to some embodiments, the system is a mixed reality system in a mixed reality environment, and the action is further associated with the mixed reality environment.

According to some embodiments, the method further comprises determining a position of the system, wherein the action is further associated with the position of the system.

According to some embodiments, in accordance with a determination that the system is associated with a first user, the action comprises a first action associated with the first user; and in accordance with a determination that the system is associated with a second user, different from the first user, the action comprises a second action associated with the second user, different from the first action.

According to some embodiments, the audio signal comprises a frequency-domain feature and a time-domain feature, and the determination of whether the audio comprises the non-linguistic input is based on the frequency-domain feature and the time-domain feature.

According to some embodiments, the method further comprises receiving information from a feature database, wherein the determination of whether the audio comprises the non-linguistic input is further based on the information.

According to some embodiments, determining whether the audio signal comprises the non-linguistic input comprises using a first processor, and the method further comprises in accordance with a determination that the audio signal comprises the non-linguistic input, waking up a second processor to perform the action.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

What is claimed is:

1. A system comprising:
   a plurality of microphones of a wearable head device; and
   one or more processors configured to perform a method comprising:
   receiving, using the plurality of microphones, an audio signal;
   determining whether the audio signal is associated with a user of the wearable head device, wherein the determining whether the audio signal is associated with the user comprises:
   determining respective distances between a source of the audio signal and each of the plurality of microphones, and
   determining, based on the respective distances, a location of the source of the audio signal;
   in accordance with a determination that the audio signal is associated with the user of the wearable head device:
   determining whether the audio signal comprises a non-linguistic input; and
   in accordance with a determination that the audio signal comprises the non-linguistic input, performing an action associated with the non-linguistic input; and
   in accordance with a determination that the audio signal is not associated with the user of the wearable head device, forgoing determining whether the audio signal comprises the non-linguistic input.

2. The system of claim 1, wherein:
   the non-linguistic input comprises a paralinguistic input, and
   in accordance with a determination that the audio signal comprises the paralinguistic input, the action comprises a first action associated with the paralinguistic input.

3. The system of claim 1, wherein:
   the non-linguistic input comprises a prosodic input, and
   in accordance with a determination that the audio signal comprises the prosodic input, the action comprises a second action associated with the prosodic input.

4. The system of claim 3, wherein the second action is a modification of an action associated with a linguistic input.

5. The system of claim 3, wherein:
   the prosodic input is indicative of an emotion associated with the user of the wearable head device, and
   the action is further associated with the emotion.

6. The system of claim 1, wherein the method further comprises:
   determining whether the audio signal comprises a linguistic input; and
   in accordance with a determination that the audio signal comprises the linguistic input, performing a third action associated with the linguistic input.

7. The system of claim 6, wherein the action comprises a modification of the third action based on the non-linguistic input.

8. The system of claim 1, wherein the method further comprises: in accordance with a determination that the audio signal comprises the non-linguistic input, receiving information associated with the audio signal from a convolutional neural network, wherein the action is performed based on the information.

9. The system of claim 1, wherein the method further comprises:
   classifying a feature of the non-linguistic input, wherein the action is performed based on the classified feature.

10. The system of claim 1, wherein the method further comprises:
    associating the action with the non-linguistic input.

11. The system of claim 1, wherein the action comprises one of texting, performing an intent, and inserting an emoji.

12. The system of claim 1, further comprising: a sensor different from the microphone, wherein the method further comprises receiving, from the sensor, information associated with an environment of the system, wherein the action is further associated with the information received from the sensor.

13. The system of claim 1, wherein:
the system comprises a mixed reality system in a mixed reality environment,
the mixed reality system comprises the wearable head device, and
the action is further associated with the mixed reality environment.

14. The system of claim 1, wherein: the method further comprises determining a position of the system, wherein the action is further associated with the position of the system.

15. The system of claim 1, wherein:
in accordance with a determination that the system is associated with a first user, the action comprises a first action associated with the first user; and
in accordance with a determination that the system is associated with a second user, different from the first user, the action comprises a second action associated with the second user, different from the first action.

16. The system of claim 1, wherein:
the audio signal comprises a frequency-domain feature and a time-domain feature, and
the determination of whether the audio comprises the non-linguistic input is based on the frequency-domain feature and the time-domain feature.

17. The system of claim 1, wherein the method further comprises:
receiving information from a feature database, wherein the determination of whether the audio comprises the non-linguistic input is further based on the information.

18. The system of claim 1, wherein determining whether the audio signal comprises the non-linguistic input comprises using a first processor, and the method further comprises: in accordance with a determination that the audio signal comprises the non-linguistic input, waking up a second processor to perform the action.

19. The system of claim 1, wherein:
the plurality of microphones comprises a first microphone and a second microphone,
the first microphone is at a first location of the wearable head device, the first microphone configured to rest at a first distance from a user's mouth, and
the second microphone is at a second location of the wearable head device, the second microphone configured to rest at a second distance from the user's mouth, the second distance unequal to the first distance.

20. A method comprising:
receiving, using a plurality of microphones of a wearable head device, an audio signal;
determining whether the audio signal is associated with a user of the wearable head device, wherein the determining whether the audio signal is associated with the user comprises:
determining respective distances between a source of the audio signal and each of the plurality of microphones, and
determining, based on the respective distances, a location of the source of the audio signal;
in accordance with a determination that the audio signal is associated with the user of the wearable head device:
determining whether the audio signal comprises a non-linguistic input; and
in accordance with a determination that the audio signal comprises the non-linguistic input, performing an action associated with the non-linguistic input; and
in accordance with a determination that the audio signal is not associated with the user of the wearable head device, forgoing determining whether the audio signal comprises the non-linguistic input.

21. A non-transitory computer-readable medium storing instructions that, when executed by one or more processors, cause the one or more processors to execute a method comprising:
receiving, using a plurality of microphones of a wearable head device, an audio signal;
determining whether the audio signal is associated with a user of the wearable head device, wherein the determining whether the audio signal is associated with the user comprises:
determining respective distances between a source of the audio signal and each of the plurality of microphones, and
determining, based on the respective distances, a location of the source of the audio signal;
in accordance with a determination that the audio signal is associated with the user of the wearable head device:
determining whether the audio signal comprises a non-linguistic input; and
in accordance with a determination that the audio signal comprises the non-linguistic input, performing an action associated with the non-linguistic input; and
in accordance with a determination that the audio signal is not associated with the user of the wearable head device, forgoing determining whether the audio signal comprises the non-linguistic input.

* * * * *